(12) United States Patent
Findlay et al.

(10) Patent No.: US 7,370,226 B2
(45) Date of Patent: *May 6, 2008

(54) SYSTEM AND METHOD FOR COMMUNICATING A SOFTWARE-GENERATED PULSE WAVEFORM BETWEEN TWO SERVERS IN A NETWORK

(75) Inventors: Bruce Findlay, Palo Alto, CA (US); Michael Chrabaszcz, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 278 days.

This patent is subject to a terminal disclaimer.

(21) Appl. No.: 11/124,864

(22) Filed: May 9, 2005
(Under 37 CFR 1.47)

(65) Prior Publication Data
US 2005/0229027 A1   Oct. 13, 2005

Related U.S. Application Data

(60) Continuation of application No. 10/287,554, filed on Nov. 1, 2002, now Pat. No. 6,895,526, which is a continuation of application No. 09/658,333, filed on Sep. 8, 2000, now Pat. No. 6,523,131, which is a division of application No. 08/942,221, filed on Oct. 1, 1997, now Pat. No. 6,163,853.

(60) Provisional application No. 60/046,327, filed on May 13, 1997.

(51) Int. Cl.
*G06F 11/00* (2006.01)
(52) U.S. Cl. .......................................... 714/4
(58) Field of Classification Search ..................... 714/4
See application file for complete search history.

(56) References Cited

U.S. PATENT DOCUMENTS 3,623,014 A * 11/1971 Doelz et al. ................... 714/6

(Continued)

FOREIGN PATENT DOCUMENTS

EP       722236 A2 * 7/1996

(Continued)

OTHER PUBLICATIONS

Cmasters, Usenet post to microsoft.public.windowsnt.setup, Aug. 1997, "Re: FDISK switches."

(Continued)

*Primary Examiner*—Bryce P Bonzo
(74) *Attorney, Agent, or Firm*—Knobbe, Martens, Olson & Bear LLP

(57) ABSTRACT

A method of monitoring a status condition of a first server with a second server in a server network, and also providing synchronization and messaging between the two servers, the method including: transmitting a software-generated pulse waveform from the first server to a device coupled to the first server, wherein the software-generated pulse waveform is comprises a first command corresponding to a logic level low and a second command corresponding to a logic level high; setting said device to a first state during logic level lows of said pulse waveform and to a second state during logic level highs of said pulse waveform; receiving the software-generated pulse waveform with the second server by determining when said device is in the first state and when it is in the second state; and determining when said device no longer changes from the first state to the second state. In order to provide synchronization and messaging, said pulse waveform is frequency modulated in order to communicate specified commands and/or reference points between the two servers.

24 Claims, 11 Drawing Sheets

U.S. PATENT DOCUMENTS

| | | | |
|---|---|---|---|
| 4,057,847 A | 11/1977 | Lowell et al. | |
| 4,100,597 A | 7/1978 | Fleming et al. | |
| 4,449,182 A | 5/1984 | Rubinson et al. | |
| 4,672,535 A | 6/1987 | Katzman et al. | |
| 4,692,918 A | 9/1987 | Elliott et al. | |
| 4,695,946 A | 9/1987 | Andreasen et al. | |
| 4,707,803 A | 11/1987 | Anthony, Jr. et al. | |
| 4,769,764 A | 9/1988 | Levanon | |
| 4,774,502 A | 9/1988 | Kimura | |
| 4,821,180 A | 4/1989 | Gerety et al. | |
| 4,835,737 A | 5/1989 | Herrig et al. | |
| 4,894,792 A | 1/1990 | Mitchell et al. | |
| 4,949,245 A | 8/1990 | Martin et al. | |
| 4,968,977 A | 11/1990 | Chinnaswamy et al. | |
| 4,999,787 A | 3/1991 | McNally et al. | |
| 5,006,961 A | 4/1991 | Monico | |
| 5,007,431 A | 4/1991 | Donehoo, III | |
| 5,033,048 A | 7/1991 | Pierce et al. | |
| 5,051,720 A | 9/1991 | Kittirutsunetorn | |
| 5,073,932 A | 12/1991 | Yossifor et al. | |
| 5,103,391 A | 4/1992 | Barrett | |
| 5,118,970 A | 6/1992 | Olson et al. | |
| 5,121,500 A | 6/1992 | Arlington et al. | |
| 5,136,708 A | 8/1992 | Lapourtre et al. | |
| 5,136,715 A | 8/1992 | Hirose et al. | |
| 5,138,619 A | 8/1992 | Fasang et al. | |
| 5,157,663 A | 10/1992 | Major et al. | |
| 5,210,855 A | 5/1993 | Bartol | |
| 5,222,897 A | 6/1993 | Collins et al. | |
| 5,245,615 A | 9/1993 | Treu | |
| 5,247,683 A | 9/1993 | Holmes et al. | |
| 5,253,348 A | 10/1993 | Scalise | |
| 5,265,098 A | 11/1993 | Mattson et al. | |
| 5,266,838 A | 11/1993 | Gerner | |
| 5,269,011 A | 12/1993 | Yanai et al. | |
| 5,272,382 A | 12/1993 | Heald et al. | |
| 5,272,584 A | 12/1993 | Austruy et al. | |
| 5,276,814 A | 1/1994 | Bourke et al. | |
| 5,276,863 A | 1/1994 | Heider | |
| 5,277,615 A | 1/1994 | Hastings et al. | |
| 5,280,621 A | 1/1994 | Barnes et al. | |
| 5,283,905 A | 2/1994 | Saadeh et al. | |
| 5,307,354 A | 4/1994 | Cramer et al. | |
| 5,311,397 A | 5/1994 | Harshberger et al. | |
| 5,311,451 A | 5/1994 | Barrett | |
| 5,317,693 A | 5/1994 | Cuenod et al. | |
| 5,329,625 A | 7/1994 | Kannan et al. | |
| 5,337,413 A | 8/1994 | Lui et al. | |
| 5,351,276 A | 9/1994 | Doll, Jr. et al. | |
| 5,367,670 A | 11/1994 | Ward et al. | |
| 5,379,184 A | 1/1995 | Barraza et al. | |
| 5,386,567 A | 1/1995 | Lien et al. | |
| 5,388,267 A | 2/1995 | Chan et al. | |
| 5,402,431 A | 3/1995 | Saadeh et al. | |
| 5,404,494 A | 4/1995 | Garney | |
| 5,423,025 A | 6/1995 | Goldman et al. | |
| 5,426,740 A | 6/1995 | Bennett | |
| 5,430,717 A | 7/1995 | Fowler et al. | |
| 5,430,845 A | 7/1995 | Rimmer et al. | |
| 5,432,715 A | 7/1995 | Shigematsu et al. | |
| 5,432,946 A | 7/1995 | Allard et al. | |
| 5,438,678 A | 8/1995 | Smith | |
| 5,440,748 A | 8/1995 | Sekine et al. | |
| 5,448,723 A | 9/1995 | Rowett | |
| 5,455,933 A | 10/1995 | Schieve et al. | |
| 5,460,441 A | 10/1995 | Hastings et al. | |
| 5,463,766 A | 10/1995 | Schieve et al. | |
| 5,465,349 A | 11/1995 | Geronimi et al. | |
| 5,471,617 A | 11/1995 | Farrand et al. | |
| 5,471,634 A | 11/1995 | Giorgio et al. | |
| 5,473,499 A | 12/1995 | Weir | |
| 5,483,419 A | 1/1996 | Kaczeus, Sr. et al. | |
| 5,485,550 A | 1/1996 | Dalton | |
| 5,487,148 A | 1/1996 | Komori et al. | |
| 5,491,791 A | 2/1996 | Glowny et al. | |
| 5,493,574 A | 2/1996 | McKinley | |
| 5,493,666 A | 2/1996 | Fitch | |
| 5,513,314 A | 4/1996 | Kandasamy et al. | |
| 5,513,339 A | 4/1996 | Agrawal et al. | |
| 5,515,515 A | 5/1996 | Kennedy et al. | |
| 5,517,646 A | 5/1996 | Piccirillo et al. | |
| 5,519,851 A | 5/1996 | Bender et al. | |
| 5,526,289 A | 6/1996 | Dinh et al. | |
| 5,528,409 A | 6/1996 | Cucci et al. | |
| 5,530,810 A | 6/1996 | Bowman | |
| 5,533,193 A | 7/1996 | Roscoe | |
| 5,533,198 A | 7/1996 | Thorson | |
| 5,535,326 A | 7/1996 | Baskey et al. | |
| 5,539,883 A | 7/1996 | Allon et al. | |
| 5,542,055 A | 7/1996 | Amini et al. | |
| 5,546,272 A | 8/1996 | Moss et al. | |
| 5,548,712 A | 8/1996 | Larson et al. | |
| 5,555,510 A | 9/1996 | Verseput et al. | |
| 5,559,764 A | 9/1996 | Chen et al. | |
| 5,559,958 A | 9/1996 | Farrand et al. | |
| 5,559,965 A | 9/1996 | Oztaskin et al. | |
| 5,560,022 A | 9/1996 | Dunstan et al. | |
| 5,564,024 A | 10/1996 | Pemberton | |
| 5,566,299 A | 10/1996 | Billings et al. | |
| 5,566,339 A | 10/1996 | Perholtz et al. | |
| 5,568,610 A | 10/1996 | Brown | |
| 5,568,619 A | 10/1996 | Blackledge et al. | |
| 5,572,403 A | 11/1996 | Mills | |
| 5,577,205 A | 11/1996 | Hwang et al. | |
| 5,579,487 A | 11/1996 | Meyerson et al. | |
| 5,579,491 A | 11/1996 | Jeffries et al. | |
| 5,579,528 A | 11/1996 | Register | |
| 5,581,712 A | 12/1996 | Herrman | |
| 5,581,714 A | 12/1996 | Amini et al. | |
| 5,584,030 A | 12/1996 | Husak et al. | |
| 5,586,250 A | 12/1996 | Carbonneau et al. | |
| 5,588,121 A | 12/1996 | Reddin et al. | |
| 5,588,144 A | 12/1996 | Inoue et al. | |
| 5,592,610 A | 1/1997 | Chittor | |
| 5,592,611 A | 1/1997 | Midgely et al. | |
| 5,596,711 A | 1/1997 | Burckhartt et al. | |
| 5,598,407 A | 1/1997 | Bud et al. | |
| 5,602,758 A | 2/1997 | Lincoln et al. | |
| 5,606,672 A | 2/1997 | Wade | |
| 5,608,865 A | 3/1997 | Midgely et al. | |
| 5,608,876 A | 3/1997 | Cohen et al. | |
| 5,615,207 A | 3/1997 | Gephardt et al. | |
| 5,621,159 A | 4/1997 | Brown et al. | |
| 5,621,892 A | 4/1997 | Cook | |
| 5,622,221 A | 4/1997 | Genga, Jr. et al. | |
| 5,623,625 A | 4/1997 | Thompson et al. | |
| 5,625,238 A | 4/1997 | Ady et al. | |
| 5,627,962 A | 5/1997 | Goodrum et al. | |
| 5,628,028 A | 5/1997 | Michelson | |
| 5,629,947 A | 5/1997 | Kellum et al. | |
| 5,630,076 A | 5/1997 | Saulpaugh et al. | |
| 5,631,847 A | 5/1997 | Kikinis | |
| 5,632,021 A | 5/1997 | Jennings et al. | |
| 5,636,341 A | 6/1997 | Matsushita et al. | |
| 5,638,289 A | 6/1997 | Yamada et al. | |
| 5,644,470 A | 7/1997 | Benedict et al. | |
| 5,644,731 A | 7/1997 | Liencres et al. | |
| 5,651,006 A | 7/1997 | Fujino et al. | |
| 5,652,832 A | 7/1997 | Kane et al. | |
| 5,652,833 A | 7/1997 | Takizawa et al. | |
| 5,652,839 A | 7/1997 | Giorgio et al. | |
| 5,652,892 A | 7/1997 | Ugajin | |
| 5,652,908 A | 7/1997 | Douglas et al. | |
| 5,655,081 A | 8/1997 | Bonnell et al. | |

| Patent | Date | Name |
|---|---|---|
| 5,655,083 A | 8/1997 | Bagley |
| 5,655,148 A | 8/1997 | Richman et al. |
| 5,659,682 A | 8/1997 | Devarakonda et al. |
| 5,664,118 A | 9/1997 | Nishigaki et al. |
| 5,664,119 A | 9/1997 | Jeffries et al. |
| 5,666,538 A | 9/1997 | DeNicola |
| 5,668,943 A | 9/1997 | Attanasio et al. |
| 5,668,992 A | 9/1997 | Hammer et al. |
| 5,669,009 A | 9/1997 | Buktenica et al. |
| 5,671,371 A | 9/1997 | Kondo et al. |
| 5,675,723 A | 10/1997 | Ekrot et al. |
| 5,680,288 A | 10/1997 | Carey et al. |
| 5,682,328 A | 10/1997 | Roeber et al. |
| 5,684,671 A | 11/1997 | Hobbs et al. |
| 5,689,637 A | 11/1997 | Johnson et al. |
| 5,696,895 A | 12/1997 | Hemphill et al. |
| 5,696,899 A | 12/1997 | Kalwitz |
| 5,696,949 A | 12/1997 | Young |
| 5,696,970 A | 12/1997 | Sandage et al. |
| 5,701,417 A | 12/1997 | Lewis et al. |
| 5,704,031 A | 12/1997 | Mikami et al. |
| 5,708,775 A | 1/1998 | Nakamura |
| 5,708,776 A | 1/1998 | Kikinis |
| 5,712,754 A | 1/1998 | Sides et al. |
| 5,715,456 A | 2/1998 | Bennett et al. |
| 5,717,570 A | 2/1998 | Kikinis |
| 5,721,935 A | 2/1998 | DeSchepper et al. |
| 5,724,529 A | 3/1998 | Smith et al. |
| 5,726,506 A | 3/1998 | Wood |
| 5,727,207 A | 3/1998 | Gates et al. |
| 5,732,266 A | 3/1998 | Moore et al. |
| 5,737,708 A | 4/1998 | Grob et al. |
| 5,737,747 A | 4/1998 | Vishlitzky et al. |
| 5,740,378 A | 4/1998 | Rehl et al. |
| 5,742,514 A | 4/1998 | Bonola |
| 5,742,833 A | 4/1998 | Dea et al. |
| 5,747,889 A | 5/1998 | Raynham et al. |
| 5,748,426 A | 5/1998 | Bedingfield et al. |
| 5,752,164 A | 5/1998 | Jones |
| 5,754,396 A | 5/1998 | Felcman et al. |
| 5,754,449 A | 5/1998 | Hoshal et al. |
| 5,754,797 A | 5/1998 | Takahashi |
| 5,758,165 A | 5/1998 | Shuff |
| 5,758,352 A | 5/1998 | Reynolds et al. |
| 5,761,033 A | 6/1998 | Wilhelm |
| 5,761,045 A | 6/1998 | Olson et al. |
| 5,761,085 A | 6/1998 | Giorgio |
| 5,761,462 A | 6/1998 | Neal et al. |
| 5,761,707 A | 6/1998 | Aiken et al. |
| 5,764,924 A | 6/1998 | Hong |
| 5,764,968 A | 6/1998 | Ninomiya |
| 5,765,008 A | 6/1998 | Desai et al. |
| 5,765,198 A | 6/1998 | McCrocklin et al. |
| 5,767,844 A | 6/1998 | Stoye |
| 5,768,541 A | 6/1998 | Pan-Ratzlaff |
| 5,768,542 A | 6/1998 | Enstrom et al. |
| 5,771,343 A | 6/1998 | Hafner et al. |
| 5,774,640 A | 6/1998 | Kurio |
| 5,774,645 A | 6/1998 | Beaujard et al. |
| 5,774,741 A | 6/1998 | Choi |
| 5,777,897 A | 7/1998 | Giorgio |
| 5,778,197 A | 7/1998 | Dunham |
| 5,781,703 A | 7/1998 | Desai et al. |
| 5,781,716 A | 7/1998 | Hemphill et al. |
| 5,781,744 A | 7/1998 | Johnson et al. |
| 5,781,767 A | 7/1998 | Inoue et al. |
| 5,781,798 A | 7/1998 | Beatty et al. |
| 5,784,555 A | 7/1998 | Stone |
| 5,784,576 A | 7/1998 | Guthrie et al. |
| 5,787,019 A | 7/1998 | Knight et al. |
| 5,787,459 A | 7/1998 | Stallmo et al. |
| 5,787,491 A | 7/1998 | Merkin et al. |
| 5,790,775 A | 8/1998 | Marks et al. |
| 5,790,831 A | 8/1998 | Lin et al. |
| 5,793,948 A | 8/1998 | Asahi et al. |
| 5,793,987 A | 8/1998 | Quackenbush et al. |
| 5,793,992 A | 8/1998 | Steele et al. |
| 5,794,035 A | 8/1998 | Golub et al. |
| 5,796,185 A | 8/1998 | Takata et al. |
| 5,796,580 A | 8/1998 | Komatsu et al. |
| 5,796,934 A | 8/1998 | Bhanot et al. |
| 5,796,981 A | 8/1998 | Abudayyeh et al. |
| 5,797,023 A | 8/1998 | Berman et al. |
| 5,798,828 A | 8/1998 | Thomas et al. |
| 5,799,036 A | 8/1998 | Staples |
| 5,799,196 A | 8/1998 | Flannery |
| 5,801,921 A | 9/1998 | Miller |
| 5,802,269 A | 9/1998 | Poisner et al. |
| 5,802,298 A | 9/1998 | Imai et al. |
| 5,802,305 A | 9/1998 | McKaughan et al. |
| 5,802,324 A | 9/1998 | Wunderlich et al. |
| 5,802,393 A | 9/1998 | Begun et al. |
| 5,802,552 A | 9/1998 | Fandrich et al. |
| 5,802,592 A | 9/1998 | Chess et al. |
| 5,803,357 A | 9/1998 | Lakin |
| 5,805,804 A | 9/1998 | Laursen et al. |
| 5,805,834 A | 9/1998 | McKinley et al. |
| 5,809,224 A | 9/1998 | Schultz et al. |
| 5,809,256 A | 9/1998 | Najemy |
| 5,809,287 A | 9/1998 | Stupek, Jr. et al. |
| 5,809,311 A | 9/1998 | Jones |
| 5,809,555 A | 9/1998 | Hobson |
| 5,812,748 A | 9/1998 | Ohran et al. |
| 5,812,750 A | 9/1998 | Dev et al. |
| 5,812,751 A | 9/1998 | Ekrot et al. |
| 5,812,757 A | 9/1998 | Okamoto et al. |
| 5,812,858 A | 9/1998 | Nookala et al. |
| 5,815,117 A | 9/1998 | Kolanek |
| 5,815,647 A | 9/1998 | Buckland et al. |
| 5,815,651 A | 9/1998 | Litt |
| 5,815,652 A | 9/1998 | Ote et al. |
| 5,821,596 A | 10/1998 | Miu et al. |
| 5,822,547 A | 10/1998 | Boesch et al. |
| 5,826,043 A | 10/1998 | Smith et al. |
| 5,829,046 A | 10/1998 | Tzelnic et al. |
| 5,835,719 A | 11/1998 | Gibson et al. |
| 5,835,738 A | 11/1998 | Blackledge, Jr. et al. |
| 5,838,932 A | 11/1998 | Alzien |
| 5,838,935 A | 11/1998 | Davis et al. |
| 5,841,964 A | 11/1998 | Yamaguchi |
| 5,841,991 A | 11/1998 | Russell |
| 5,845,061 A | 12/1998 | Miyamoto et al. |
| 5,845,095 A | 12/1998 | Reed et al. |
| 5,850,546 A | 12/1998 | Kim |
| 5,852,720 A | 12/1998 | Gready et al. |
| 5,852,724 A | 12/1998 | Glenn, II et al. |
| 5,857,074 A | 1/1999 | Johnson |
| 5,857,102 A | 1/1999 | McChesney et al. |
| 5,864,653 A | 1/1999 | Tavallaei et al. |
| 5,864,654 A | 1/1999 | Marchant |
| 5,864,713 A | 1/1999 | Terry |
| 5,867,730 A | 2/1999 | Leyda |
| 5,875,307 A | 2/1999 | Ma et al. |
| 5,875,308 A | 2/1999 | Egan et al. |
| 5,875,310 A | 2/1999 | Buckland et al. |
| 5,878,237 A | 3/1999 | Olarig |
| 5,878,238 A | 3/1999 | Gan et al. |
| 5,881,311 A | 3/1999 | Woods |
| 5,884,027 A | 3/1999 | Garbus et al. |
| 5,884,049 A | 3/1999 | Atkinson |
| 5,886,424 A | 3/1999 | Kim |
| 5,889,965 A | 3/1999 | Wallach et al. |
| 5,892,898 A | 4/1999 | Fujii et al. |
| 5,892,915 A | 4/1999 | Duso et al. |
| 5,892,928 A | 4/1999 | Wallach et al. |
| 5,893,140 A | 4/1999 | Vahalia et al. |

| | | | |
|---|---|---|---|
| 5,898,846 | A | 4/1999 | Kelly |
| 5,898,888 | A | 4/1999 | Guthrie et al. |
| 5,905,867 | A | 5/1999 | Giorgio |
| 5,907,672 | A | 5/1999 | Matze et al. |
| 5,909,568 | A | 6/1999 | Nason |
| 5,911,779 | A | 6/1999 | Stallmo et al. |
| 5,913,034 | A | 6/1999 | Malcolm |
| 5,918,057 | A | 6/1999 | Chou et al. |
| 5,922,060 | A | 7/1999 | Goodrum |
| 5,930,358 | A | 7/1999 | Rao |
| 5,935,262 | A | 8/1999 | Barrett et al. |
| 5,936,960 | A | 8/1999 | Stewart |
| 5,938,751 | A | 8/1999 | Tavallaei et al. |
| 5,941,996 | A | 8/1999 | Smith et al. |
| 5,958,069 | A * | 9/1999 | Kawasaki et al. ............ 714/11 |
| 5,964,855 | A | 10/1999 | Bass et al. |
| 5,983,349 | A | 11/1999 | Kodama et al. |
| 5,987,554 | A | 11/1999 | Liu et al. |
| 5,987,621 | A | 11/1999 | Duso et al. |
| 5,987,627 | A | 11/1999 | Rawlings, III |
| 6,009,535 | A | 12/1999 | Halligan et al. |
| 6,012,130 | A | 1/2000 | Beyda et al. |
| 6,038,624 | A | 3/2000 | Chan et al. |
| 6,145,089 | A | 11/2000 | Le et al. |
| 6,163,853 | A | 12/2000 | Findlay et al. |
| 6,170,028 | B1 | 1/2001 | Wallach et al. |
| 6,173,346 | B1 | 1/2001 | Wallach et al. |
| 6,179,486 | B1 | 1/2001 | Wallach et al. |
| 6,192,434 | B1 | 2/2001 | Wallach et al. |
| 6,219,734 | B1 | 4/2001 | Wallach et al. |
| 6,247,080 | B1 | 6/2001 | Wallach et al. |
| 6,247,099 | B1 | 6/2001 | Skazinski et al. |
| 6,272,648 | B1 | 8/2001 | Findlay et al. |
| 6,304,929 | B1 | 10/2001 | Wallach et al. |
| 6,363,462 | B1 * | 3/2002 | Bergsten ..................... 711/162 |
| 6,625,705 | B2 * | 9/2003 | Yanai et al. ................ 711/162 |

FOREIGN PATENT DOCUMENTS

| | | |
|---|---|---|
| EP | 0 866 403 A1 | 9/1998 |
| JP | 04 333 118 A | 11/1992 |
| JP | 05 233 110 A | 9/1993 |
| JP | 07 093 064 A | 4/1995 |
| JP | 07 261 874 A | 10/1995 |

OTHER PUBLICATIONS

Compaq Computer Corporation, Phenix Technologies, LTD, and Intel Corporation, *specification*, 55 pages, May 5, 1994, "Plug & Play BIOS Specification."

Davis, T., Usenet post to alt.msdos.batch, Apr. 1997, "Re: Need help with automating FDISK and FORMAT . . . ".

Davis, T, Usenet post to alt.msdos.programmer, Apr. 1997, "Re: How do I create an FDISK batch file!"

"The Flight Recorder: An Architectural Aid for System Monitoring."

Hildebrand, N., Usenet post to comp.msdos.programmer, May 1995, "Re: Structure of disk partition into."

IBM Technical Disclosure Bulletin, 92A+62947, pp. 391-394, Oct. 1992, "Method for Card Hot Plug Detection and Control".

Lewis, L., Usenet post to alt.msdos.batch, Apr. 1997, "Re: Need help with automating FDISK and FORMAT."

Lyons, Computer Reseller News, Issue 721, pp. 61-62, Feb. 3, 1997, "ACC Releases Low-Cost Solution for ISPs."

M2 Communications, M2 Presswire, 2 pages, Dec. 19, 1996, "Novell IntranetWare Supports Hot Pluggable PCI from NetFRAME."

NetFrame Systems Incorporated, Doc. No. 78-1000226-01, pp. 1-2, 5-8, 359-404, and 471-512, Apr. 1996, "NetFrame Clustered Multiprocessing Software: NW0496 DC-ROM for Novel® NetWare® 4.1 SMP, 4.1, and 3.12."

Netframe, http://www.netframe-support.com/technology/datasheets/data.htm, before Mar. 1997, "Netframe ClusterSystem 9008 Data Sheet."

PCI Hot-Plug Specification, Preliminary Revision for Review Only, Revision 0.9, pp. i-vi, and 1-25, Mar. 5, 1997.

Rigney, PC Magazine, 14(17): 375-379, Oct. 10, 1995, "The One for the Road (Mobile-aware capabilities in Windows 95)."

SES SCSI-3 Enclosure Services, X3T10/Project 1212-D/Rev 8a, pp. i, iii-x, 1-76, and I-1 (index), Jan. 16, 1997.

Shanley, and Anderson, PCI System Architecture, Third Edition, Chapter 15, pp. 297-302, Copyright 1995, "Intro To Configuration Address Space."

Shanley, and Anderson, PCI System Architecture, Third Edition, Chapter 16, pp. 303-328, Copyright 1995, "Configuration Transactions."

Shanley, and Anderson, PCI System Architecture, Third Edition, p. 382, Copyright 1995.

Simos, M., Usenet post to comp.os.msdos.misc, Apr. 1997, "Re: Auto FDISK and FORMAT."

Sun Microsystems, Part No. 802-6569-11, Release 1.0.1, Nov. 1996, "Remote Systems Diagnostics Installation & User Guide."

Sun Microsystems Computer Company, Part No. 802-5355-10, Rev. A, May 1996, "Solstice SyMON User's Guid."

Wood, M. H., Usenet post to comp.os.netware.misc, Aug. 1996, "Re: Workstation duplication method for WIN95."

ftp.cdrom.com/pub/os2/diskutil/, PHDX software, phdx.zip download, Mar. 1995, "Parallel Hard Disk Xfer."

Haban, D. & D. Wybranietz, *IEEE Transaction on Software Engineering*, 16(2):197-211, Feb. 1990, "A Hybrid Monitor for Behavior and Performance Analysis of Distributed Systems."

Plasmon M-Series M52, M104, M156, and M258 Optical Disk Library Systems, SCSI Software Interface Specification, Document No. 303432C, Nov. 1996.

Institute of Information & Computer Sciences, scsi-faq/part1, last modified Mar. 31, 1998.

SPARCstorage Array User's Guide—Sep. 1996, Chapter 8, Getting Started.

"Takeover Scheme for Control of Shared Disks" IBM Technical Disclosure Bulletin, Jul. 1989, vol. 32, issue 2, pp. 378-380.

Compaq Computer Corp., Technology Brief, pp. 1-13, Dec. 1996 "Where Do I Plug the Cable? Solving the Logical-Physical Slot Numbering Problem."

* cited by examiner

RESULTS:
FFFFFFFFSSSSSSSSFFFFFFFFSSSSSSSSFFFFFFFF

PULSE:

601 — REFERENCE POINT #2 – EXPECT RESERVED (RESULTS=FAILURE)
603 — REFERENCE POINT #1 – EXPECT RELEASED (RESULTS=SUCCESS)

MAL OVERHEAD:

701 — REFERENCE POINT #1
703 — REFERENCE POINT #2

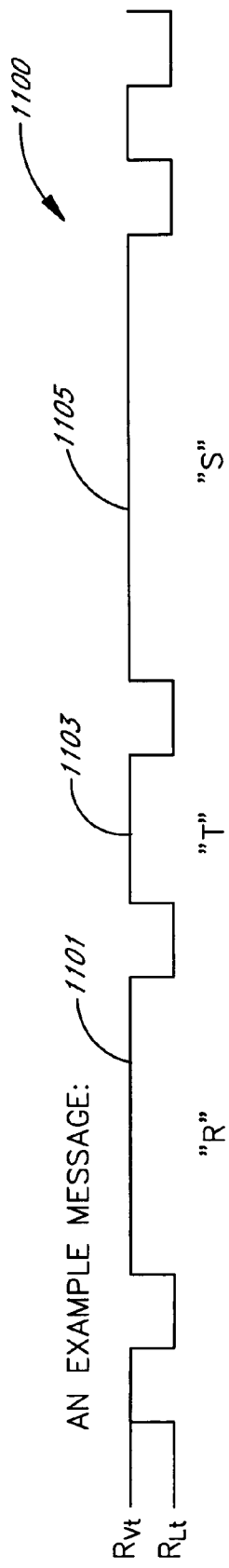
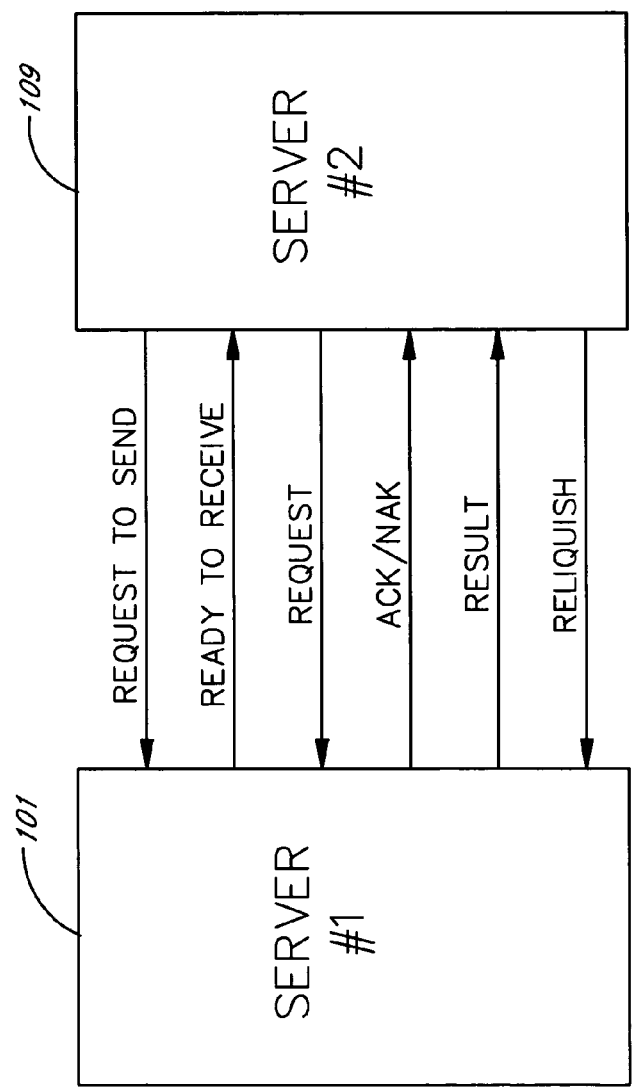

SYSTEM AND METHOD FOR COMMUNICATING A SOFTWARE-GENERATED PULSE WAVEFORM BETWEEN TWO SERVERS IN A NETWORK

RELATED APPLICATIONS

This application is a continuation of U.S. patent application Ser. No. 10/287,554, filed Nov. 1, 2002, now U.S. Pat. No. 6,895,526, which is a continuation of U.S. patent application Ser. No. 09/658,333, filed Sep. 8, 2000, now U.S. Pat. No. 6,523,131, which is a divisional of U.S. patent application Ser. No. 08/942,221, filed Oct. 1, 1997, now U.S. Pat. No. 6,163,853, which claims the benefit of U.S. Provisional Application No. 60/046,327 filed May 13, 1997, the entirety of which are hereby incorporated herein by reference.

INCORPORATION BY REFERENCE OF COMMONLY OWNED APPLICATIONS

The following patent applications, commonly owned and filed Oct. 1, 1997, are hereby incorporated herein in their entirety by reference thereto:

| Title | Application No./ Patent No. |
|---|---|
| System Architecture for Remote Access and Control of Environmental Management | 08/942,160 6,266,721 |
| Method of Remote Access and Control of Environmental Management | 08/942,215 6,189,109 |
| System for Independent Powering of Diagnostic Processes on a Computer System | 08/942,410 6,202,160 |
| Method of Independent Powering of Diagnostic Processes on a Computer System | 08/942,320 6,134,668 |
| Diagnostic and Managing Distributed Processor System | 08/942,402 6,338,150 |
| Method for Managing a Distributed Processor System | 08/942,448 6,249,885 |
| System for Mapping Environmental Resources to Memory for Program Access | 08/942,222 6,122,758 |
| Method for Mapping Environmental Resources to Memory for Program Access | 08/942,214 6,199,173 |
| Hot Add of Devices Software Architecture | 08/942,309 |
| Method for The Hot Add of Devices | 08/942,306 6,247,080 |
| Hot Swap of Devices Software Architecture | 08/942,311 6,192,434 |
| Method for The Hot Swap of Devices | 08/942,457 6,304,929 |
| Method for the Hot Add of a Network Adapter on a System Including a Dynamically Loaded Adapter Driver | 08/943,072 5,892,928 |
| Method for the Hot Add of a Mass Storage Adapter on a System Including a Statically Loaded Adapter Driver | 08/942,069 6,219,734 |
| Method for the Hot Add of a Network Adapter on a System Including a Statically Loaded Adapter Driver | 08/942,465 6,202,111 |
| Method for the Hot Add of a Mass Storage Adapter on a System Including a Dynamically Loaded Adapter Driver | 08/962,963 6,179,486 |
| Method for the Hot Swap of a Network Adapter on a System Including a Dynamically Loaded Adapter Driver | 08/943,078 5,889,965 |
| Method for the Hot Swap of a Mass Storage Adapter on a System Including a Statically Loaded Adapter Driver | 08/942,336 6,249,828 |
| Method for the Hot Swap of a Network Adapter on a System Including a Statically Loaded Adapter Driver | 08/942,459 6,219,734 |
| Method for the Hot Swap of a Mass Storage Adapter on a System Including a Dynamically Loaded Adapter Driver | 08/942,458 6,173,346 |
| Method of Performing an Extensive Diagnostic Test in Conjunction with a BIOS Test Routine | 08/942,463 6,035,420 |
| Apparatus for Performing an Extensive Diagnostic Test in Conjunction with a BIOS Test Routine | 08/942,163 6,009,541 |
| Configuration Management Method for Hot Adding and Hot Replacing Devices | 08/941,268 6,148,355 |
| Configuration Management System for Hot Adding and Hot Replacing Devices | 08/942,408 6,243,773 |
| Apparatus for Interfacing Buses | 08/942,382 6,182,180 |
| Method for Interfacing Buses | 08/942,413 5,987,554 |
| Computer Fan Speed Control Device | 08/942,447 5,990,582 |
| Computer Fan Speed Control Method | 08/942,216 5,962,933 |
| System for Powering Up and Powering Down a Server | 08/943,076 6,122,746 |
| Method of Powering Up and Powering Down a Server | 08/943,077 6,163,849 |
| System for Resetting a Server | 08/942,333 6,065,053 |
| Method of Resetting a Server | 08/942,405 6,330,690 |
| System for Displaying Flight Recorder | 08/942,070 6,138,250 |
| Method of Displaying Flight Recorder | 08/942,068 6,073,255 |
| Synchronous Communication Interface | 08/943,355 6,219,711 |
| Synchronous Communication Emulation | 08/942,004 6,068,661 |
| Software System Facilitating the Replacement or Insertion of Devices in a Computer System | 08/942,317 6,134,615 |
| Method for Facilitating the Replacement or Insertion of Devices in a Computer System | 08/942,316 6,134,614 |
| System Management Graphical User Interface | 08/943,357 |
| Display of System Information | 08/942,195 6,046,742 |
| Data Management System Supporting Hot Plug Operations on a Computer | 08/942,129 6,105,089 |
| Data Management Method Supporting Hot Plug Operations on a Computer | 08/942,124 6,058,445 |
| Alert Configurator and Manager | 08/942,005 6,425,006 |
| Managing Computer System Alerts | 08/943,356 6,553,416 |
| Computer Fan Speed Control System | 08/940,301 6,247,898 |
| Computer Fan Speed Control System Method | 08/941,267 6,526,333 |
| Black Box Recorder for Information System Events | 08/942,381 6,269,412 |
| Method of Recording Information System Events | 08/942,164 6,282,673 |
| Method for Automatically Reporting a System Failure in a Server | 08/942,168 6,243,838 |
| System for Automatically Reporting a System Failure in a Server | 08/942,384 6,170,067 |
| Expansion of PCI Bus Loading Capacity | 08/942,404 6,249,834 |
| Method for Expanding PCI Bus Loading Capacity | 08/942,223 6,195,717 |
| System for Displaying System Status | 08/942,347 6,145,098 |
| Method of Displaying System Status | 08/942,071 6,088,816 |
| Fault Tolerant Computer System | 08/942,194 6,175,490 |
| Method for Hot Swapping of Network Components | 08/943,044 6,324,608 |
| A Method for Communicating a Software Generated Pulse Waveform Between Two Servers in a Network | 08/942,221 6,163,853 |
| A System for Communicating a Software Generated Pulse Waveform Between Two Servers in a Network | 08/942,409 6,272,648 |
| Method for Clustering Software Applications | 08/942,318 6,134,673 |
| System for Clustering Software Applications | 08/942,411 6,363,497 |

-continued

| Title | Application No./Patent No. |
|---|---|
| Method for Automatically Configuring a Server after Hot Add of a Device | 08/942,319<br>6,212,585 |
| System for Automatically Configuring a Server after Hot Add of a Device | 08/942,331<br>6,263,387 |
| Method of Automatically Configuring and Formatting a Computer System and Installing Software | 08/942,412<br>6,154,835 |
| System for Automatically Configuring and Formatting a Computer System and Installing Software | 08/941,955<br>6,138,179 |
| Determining Slot Numbers in a Computer | 08/942,462<br>6,269,417 |
| System for Detecting Errors in a Network | 08/942,169<br>6,208,616 |
| Method of Detecting Errors in a Network | 08/940,302<br>6,052,733 |
| System for Detecting Network Errors | 08/942,407<br>6,105,151 |
| Method of Detecting Network Errors | 08/942,573<br>6,134,678 |

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to communications between two computer systems. More particularly, the invention relates to providing communications between two servers in a server network, for monitoring the operational status of the servers, synchronizing events or actions initiated by the servers, and providing messaging capability between the two servers.

2. Description of the Related Art

As computer systems and networks become more complex, various systems for promoting fault tolerance in these networks have been developed. One method of preventing network down-time due to the failure or removal of a fileserver from a server network is to implement "server mirroring". Server mirroring as it is currently implemented requires a primary server, a primary storage device, a backup server, a backup storage device and a unified operating system linking the two servers and storage devices. The purpose of the backup server is to resume the operations of the primary server should it become inoperational. An example of a mirrored server product is provided by Software Fault Tolerance Level 3 (SFT III) provided by NOVELL INC., 1555 North Technology Way, Orem, Utah, as an add-on to its NetWare □ 4.x product. SFT III maintains servers in an identical state of data update. It separates hardware-related operating system (OS) functions on the mirrored servers so that a fault on one hardware platform does not affect the other.

The server OS is designed to work in tandem with two servers. One server is designated as a primary server, and the other is a secondary server. The primary server is the main point of update; the secondary server is in a constant state of readiness to take over. Both servers receive all updates through a special link called a mirrored server link (MSL), which is dedicated to this purpose. The servers also communicate over the local area network (LAN) that they share in common, so that one knows if the other has failed even if the MSL has failed. When a failure occurs, the second server automatically takes over without interrupting communications in any user-detectable way. Each server monitors the other server's NetWare Core Protocol (NCP) acknowledgments over the LAN to see that all requests for that server are serviced and that OSs are constantly maintained in a mirrored state.

When the primary server fails, the secondary server detects the failure and immediately takes over as the primary server. The failure is detected in one or both of two ways: the MSL link generates an error condition when no activity is noticed, or the servers communicate over the LAN, each one monitoring the other's NCP acknowledgment. The primary server is simply the first server of the pair that is brought up. It then becomes the server used at all times and it processes all requests. When the primary server fails, the secondary server is immediately substituted as the primary server with identical configurations. The switch-over is handled entirely at the server end, and work continues without any perceivable interruption.

Although server mirroring increases security against down-time caused by a failed server, it does so at a considerable cost. This method of providing fault tolerance requires the additional expense and complexity of standby hardware that is not used unless there is a failure in the primary server.

Another method of providing fault tolerance in a server network which does not require additional redundant (mirrored) hardware is referred to as "clustering" the servers in the network. Under one type of clustering method, a replicated Network Directory Database (NDD) operates in conjunction with server resident processes, running on a cooperating set of servers called a cluster, to remap a network resource to an alternate server, in the event of a primary server failure. A remappable resource is called a clustered resource. The records/objects in the replicated database contain for each clustered network resource, a primary and a secondary server affiliation. Initially, all users access a network resource through the server identified in the replicated database as being the primary server for the network resource. When server resident processes detect a failure of that primary server, the replicated database is updated to reflect the failure of the primary server, and to change the affiliation of that network resource from its primary to its backup server.

This remapping occurs transparently to whichever user/client is accessing the network resource.

As a result of the remapping, all users access the clustered network resource through the server identified in the replicated database as the backup server for the resource. When the primary server returns to service, the replicated resident processes detect a return to service of the primary server, the replicated database is again updated to reflect the resumed operation of the primary server. As a result of these latter updates to the replicated database, all users once again access the network resource through the server identified in the replicated database as the primary server for the clustered network resource. This remapping of clustered network resource affiliations also occurs transparently to whichever user/client is accessing the network resource, and returns the resource to its original fault tolerant state. A further discussion of the operation and theory of clustered networks is provided in a U.S. provisional patent application, entitled, "Clustering Of Computer Systems Using Uniform Object Naming And Distributed Software For Locating Objects," which is listed above under the heading "Priority claim."

The clustering method of remapping the affiliation of a network resource, reduces the amount of hardware, software and processing overhead required to provide fault tolerance, when compared with the mirrored server technique. However, in both of these methods and systems, a rather inefficient and costly method of monitoring the status of each server in the network is utilized. In order to detect that a primary server has failed, for example, these methods require both a primary server and a secondary server to communicate messages and commands across a LAN line and to process received messages and commands in accordance with a specified monitoring protocol.

One drawback of this method of providing communications between two or more servers within a server network is that it relies on a dedicated communications line, the LAN line, to communicate messages between the servers in the network. The LAN line is a valuable system resource which should be allocated only when necessary. Additionally, communicating across the LAN line is not totally reliable. If the bandwidth capacity of the LAN line is reached, or if the LAN line becomes physically damaged, it will not be able to handle communications from one server to another. Therefore, in order to provide a reliable method of monitoring and/or communicating between servers, a secondary method of communicating in the event that the LAN line becomes disabled is typically required. One such prior art secondary method includes a first server writing data, commands or information to an intermediate hard drive connected to a SCSI bus and a second server which reads the data, commands or information from the hard drive. Therefore, the hard drive serves as an intermediate depository for communicating between the SCSI adapters of two or more servers. One problem with this approach is that it creates a dependency on that device which is often a central point of failure. For example, if the hard drive "crashes", the two servers will not be able to communicate with each other.

A typical prior art LAN handshake protocol between two servers includes the following steps: a first adapter of a first server will send a NetWare☐ Core Protocol (NCP) packet to a second adapter card of a second server in order to check whether a second server is handling all its requests. The first adapter card must then wait for the second adapter card to receive the NCP signal, process it, and then send a response, which contains the intranetware address of the second adapter card. If the first adapter does not receive the intranetware address data in response to its NCP packet, the first adapter will wait for a specified amount of time after which the handshake protocol "times out" and ends, resulting in a failure to achieve a communications link with the first server.

This approach is time-consuming and requires much "overhead" in terms of processing time and logic circuitry to process and synchronize the series of commands and data transferred between the adapters of two servers trying to communicate with one another. Therefore, what is needed is a method and system for establishing communications between two or more servers within a server network such that the status of a server may be monitored, events and actions initiated by the servers may be synchronized with one another, and two or more servers may communicate with one another in a cost efficient and reliable manner. Additionally, such a method and system should reduce the amount of required "overhead", in terms of processing time and system resources.

SUMMARY OF THE INVENTION

The invention addresses the above and other needs by providing a method and system of communicating between two servers of a server network so as to monitor the status of each server by the other, to time and/or synchronize the events and actions initiated by one server with respect to the other, and further to provide bi-directional messaging capability between the two servers.

In one embodiment of the invention, a method of monitoring an operational status of a first server with a second server, includes: successively transmitting first and second command signals to a device coupled to the first server, wherein the first command signal places the device in a first status condition and the second command signal places the device in a second status condition; and monitoring a status condition of the device with the second server, coupled to the device, wherein a change in the status condition of the device indicates that the first server is operational.

In another embodiment, a method of monitoring a status condition of a first server with a second server in a server network, includes: transmitting a software-generated pulse waveform from the first server to a device coupled to the first server, wherein the software-generated pulse waveform comprises a first command corresponding to a logic level low and a second command corresponding to a logic level high; setting the device to a first state during logic level lows of the pulse waveform and to a second state during logic level highs of the pulse waveform; receiving the software-generated pulse waveform with the second server by determining when the device is in the first state and when it is in the second state; and determining when the device no longer changes from the first state to the second state.

In a further embodiment, a method of monitoring a status condition of a first server by a second server, includes: transmitting SCSI Reserve and Release commands from the server to a SCSI device, coupled to the first server; and monitoring a released/reserved status of the SCSI device with the second server.

In yet a further embodiment, a method of assigning control over a network resource, includes: transmitting SCSI Reserve and Release commands from a first server to a SCSI device, coupled to the first server; monitoring a released/reserved status of the SCSI device with a second server; determining if the first server is operational; and if it is determined that the first server has failed, assigning control over the SCSI device to the second server.

In another embodiment, a method of synchronizing a first operation carried out by a first server with a second operation carried out by a second server, includes: transmitting a software-generated pulse waveform, having a first frequency, from the first server to a device coupled to the first server; receiving the pulse waveform with the second server by monitoring a status condition of the device; transmitting from the first server a synchronization signal to the device by changing the frequency of the pulse waveform to a second frequency; detecting by the second server the synchronization signal by detecting a change in frequency of the pulse waveform; changing at the first server the frequency of the pulse waveform back to the first frequency; detecting by the second server a change in frequency from the second frequency back to the first frequency; and setting in both servers a reference point in time at a beginning of a first cycle of the pulse waveform after it has returned to the first frequency.

In yet another embodiment, a method of providing communications between a first server and a second server, includes: transmitting a first software-generated pulse waveform from the first server to a first device coupled to the first server, wherein the first pulse waveform changes a status condition of the first device between a first state and a second state; receiving the first software-generated pulse waveform with the second server by sampling the status condition of the first device; frequency modulating the first pulse waveform so as to encode a message into the pulse waveform; and reading the message with the second server by sampling the status condition of the first device at a predetermined first sampling rate.

In another embodiment, a method of providing communications between a first server and a second server, includes: executing a first pulse transmitter program in the first server so as to transmit a first software-generated pulse waveform from the first server to a first device coupled to the first server, wherein the pulse waveform changes a status condition of the first device between a first state and a second state; executing a first pulse receiver program in the second server so as to receive the first software-generated pulse waveform by sampling the status condition of the first device; frequency modulating the first pulse waveform so as to encode a first message into the first pulse waveform; reading the first message with the second server by sampling the status condition of the first device at a predetermined first sampling rate; executing a second pulse transmitter program in the second server for transmitting a second software-generated pulse waveform from the second server to a second device coupled to the second server, wherein the second pulse waveform changes a status condition of the second device between a third state and a fourth state; executing a second pulse receiver program in the first server for receiving the second software-generated pulse waveform with the first server by sampling the status condition of the second device; frequency modulating the second pulse waveform so as to encode a second message into the second pulse waveform; and reading the second message with the first server by sampling the status condition of the second device at a predetermined second sampling rate.

BRIEF DESCRIPTION OF THE DRAWINGS

FIG. 6 illustrates a pulse waveform being sampled at predetermined reference points, 180 degrees apart on the waveform, for purposes of monitoring the waveform for its presence in accordance with one embodiment of the invention.

FIG. 7 illustrates a pulse waveform being sampled at predetermined reference points, which are several cycles apart on the waveform, for purposes of monitoring the waveform for its presence in accordance with the invention.

FIG. 11 illustrates a modulated pulse waveform for providing messaging capability between two servers in accordance with one embodiment of the invention.

FIG. 12 illustrates a messaging protocol that may be utilized by two servers in accordance with one embodiment of the invention.

DETAILED DESCRIPTION OF THE PREFERRED EMBODIMENT

The invention is described in detail below with reference to the figures, wherein like elements are referenced with like numerals throughout.

Figure 1:
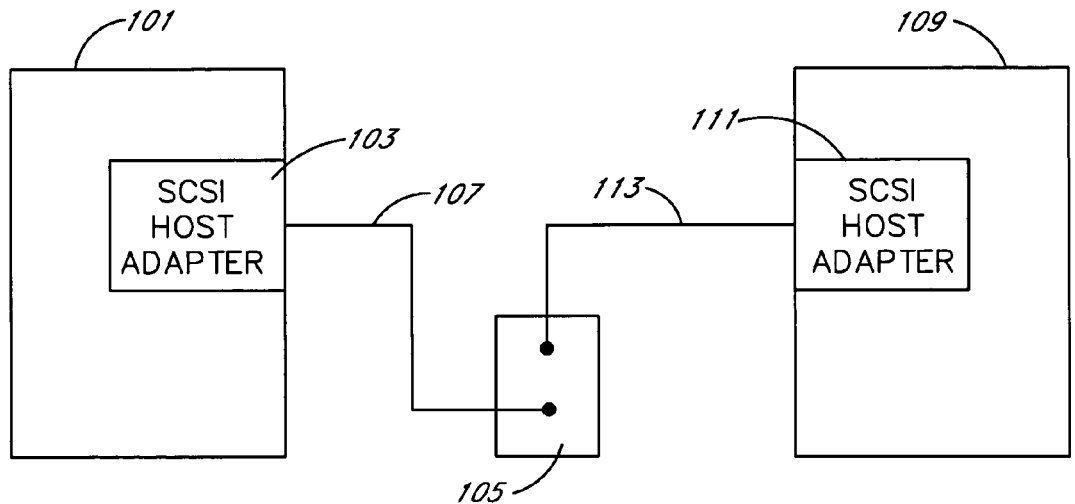
FIG. 1 is a block diagram of a clustered server network having two file servers coupled to a SCSI device in accordance with one embodiment of the invention.

The invention utilizes command signals sent from a SCSI adapter card to a SCSI device in order to reserve and release access time to that device by that server. Referring to FIG. 1, a block diagram of one embodiment of a clustered server network 100 is illustrated. The server network 100 includes a first file server computer 101 having a first SCSI host adapter card 103 coupled thereto. The first adapter card 103 is coupled to a SCSI device 105 for communicating commands and data to and from the SCSI device 105 by means of a first SCSI bus 107. The server network 100 also includes a second file server computer 109 having a second SCSI host adapter card 111 contained therein. The second adapter card 111 is also connected to the SCSI device 105 by means of a second SCSI bus 113. In another embodiment, each of the servers, 101 and 109, may be connected to two or more common SCSI devices, such as SCSI device 105, in order to provide fault tolerance and redundancy in the event that the SCSI device 105 becomes inoperational or otherwise damaged.

Typically, during normal operating conditions, only one server is allowed access and control of a single SCSI device at any one time. In order to arbitrate access and control over a SCSI device between multiple servers, a second SCSI host protocol is typically used in order to provide this function. In such a protocol, only one server is designated as a host server to the SCSI device and other servers may not access the device when the host server is accessing or desires to access the device. This protocol is accomplished by the SCSI commands of Reserve Unit, Release Unit, and Test Unit Ready, which are transmitted to the SCSI device by the servers connected to that device.

However, as described above, in a clustered server network, the assignment and control of host and backup status to each of the servers in the network is accomplished by means of a cluster data software program which maps and remaps the affiliation of a particular device to a particular server. Therefore, in a clustered network, the use of the SCSI Reserve and Release commands are not necessary to establish which server is the host server of a particular SCSI device. Therefore, the SCSI command protocol for establishing access rights to a SCSI device are no longer necessary and these command signals are free to be manipulated and utilized for other purposes.

Embodiments of the invention take advantage of these idle command signals and utilize the Reserve Unit, Release Unit and Test Unit Ready commands in order to communicate from one server to another. The Reserve Unit command and Release Unit command may serve as unique logic levels, while the Test Unit Ready command is used to read and monitor these "logic levels". By manipulating the Reserve and Release commands a "software generated pulse waveform" may be created to communicate messages from one server to another.

In order to generate this software-generated pulse waveform, at least the host server is encoded with a "Pulse Transmitter" software program (hereinafter "pulse transmitter" or "pulse transmitter module") which generates the Reserve and Release signals, or commands, and transmits them to a SCSI device. The processing time and circuitry overhead to create this pulse waveform is nominal. As used herein, the term "module" refers to any software program, subprogram, subroutine of a program, or software code capable of performing a specified function. Also, as used herein, the terms "command", "signal" and "data" and any conjugations and combinations thereof, are used synonymously and interchangeably and refer to any information or value that may be transmitted, received or communicated between two electronic systems.

Figure 2:
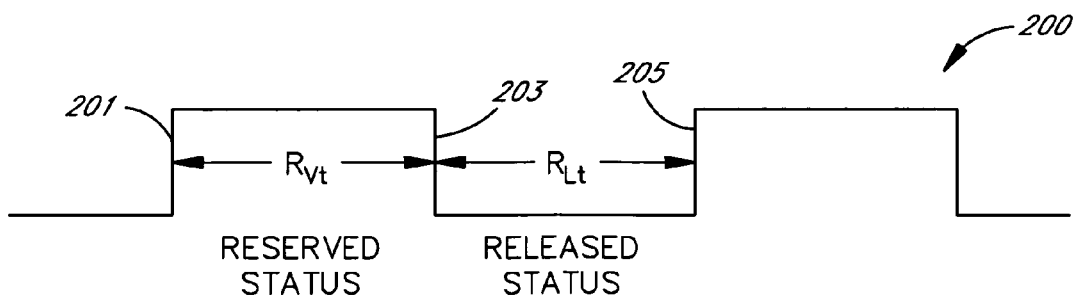
FIG. 2 illustrates a pulse waveform representing the reserved (logic high) and released (logic low) states of a SCSI device.

To further illustrate the concept of creating a software-generated pulse waveform, reference is made to FIG. 2. In this figure, the Reserve command is represented as a logic level high and the Release command is represented as a logic level low. However, it should be kept in mind that this is only a convenient way of "labeling" these commands for the purpose of using them as a signaling tool. These commands in actuality are streams of data which are transmitted to a SCSI device for the purpose of reserving or releasing access to the device. As shown in FIG. 2, the time that the device is reserved is represented by a logic level high beginning at a rising edge 201 and ending at a falling edge 203. The period of time between the rising and falling edges 201 and 203, respectively, is referred to as the "Reservation time" (Rvt). The time that the device is released is represented by a logic level low beginning at the falling edge 203 and ending at a rising edge 205. The period of time between the falling and rising edges 203 and 205, respectively, is referred to as the "Release time" (Rlt). For the purpose of providing a signal that a host server 101, is "alive" and operational, the pulse waveform may be uniform, that is Rvt=Rlt. However, it is not required that it be uniform. For example, Rvt may equal ½×Rlt. Furthermore, as described in further detail below, for the purpose of providing timing and synchronization signals, and messaging capability, this pulse waveform may be frequency modulated, for example, in order to provide messages, commands, timing reference points, etc.

In order to transmit this pulse waveform to the SCSI device, the pulse transmitter software code makes a call to a specified SCSI driver program contained within a hard drive that is currently loaded in memory and executed on the host server 101. The SCSI driver then utilizes the SCSI adapter card 103, otherwise known as the SCSI initiator or SCSI board, to send either a Reserve or Release command to the SCSI device.

Figure 3:
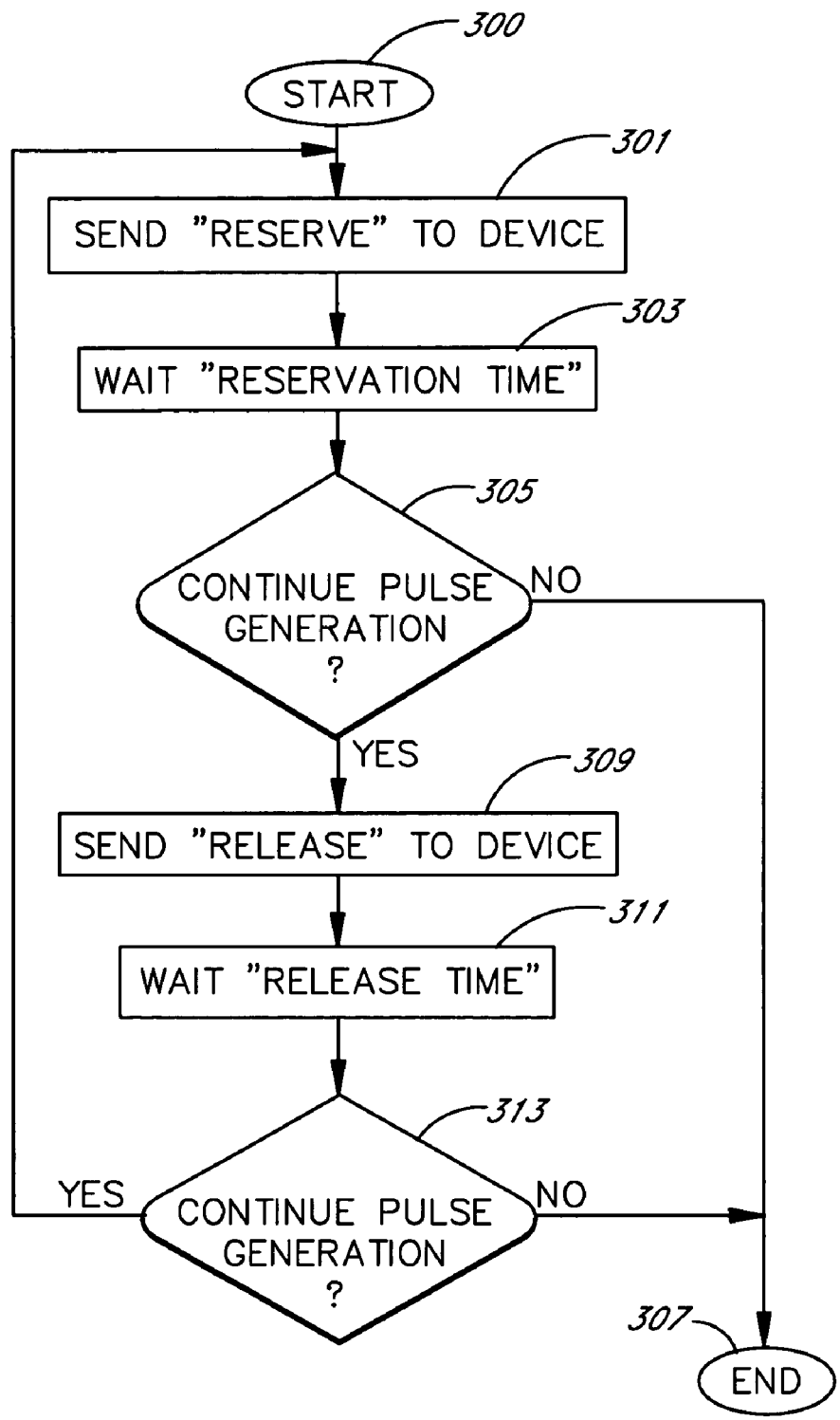
FIG. 3 is flowchart diagram illustrating the steps of one embodiment of a pulse transmitter software program for generating a software-generated pulse waveform in accordance with the invention.

Referring to FIG. 3, a flowchart diagram of one embodiment of the software code for transmitting a software pulse waveform to a SCSI device is illustrated. The process begins at start 300 and proceeds to step 301 in which the pulse transmitter sends a Reserve command to the device. In step 303, the pulse transmitter will wait until a prespecified amount of reservation time (Rlt) has elapsed. In step 305, the pulse transmitter determines whether to continue pulse generation. If in step 305 it is determined to discontinue pulse generation, the process moves to step 307 where it ends. On the other hand, if in step 305 it is determined that the pulse transmitter is to continue pulse generation, in step 309, it will send a Release command to the device. In step 311, the pulse transmitter will then wait until a prespecified period of release time (Rlt) has elapsed. In step 313, the pulse transmitter once again determines whether to continue pulse generation. If the answer is no, the process goes to step 307 where it ends. If the answer is yes, the process loops back to step 301 so that the above steps may be repeated.

In order to communicate between the host server 101 and the secondary, or backup, server 109, a "Pulse Receiver" program (hereinafter "pulse receiver" or "pulse receiver module") within the backup server 109 may listen to the pulse generated by the pulse transmitter of the host server. Similar to the pulse transmitter within the host server 101, the pulse receiver is a software program stored within a memory of the backup server 109 and executed by the backup server 109. To detect the state of the pulse, the pulse receiver may send a "Test Unit Ready" command to the device 105 (FIG. 1). Upon receiving the Test command, the device 105 may indicate whether it is reserved, indicating a failed test, or released, indicating a successful test by transmitting back to the pulse receiver, response data which contains information pertaining to its reserved/released status. The rate at which the "Test Unit Ready" command is transmitted to the SCSI device 105, otherwise known as the sample rate herein, is typically much faster than the rate at which the pulse waveform changes state. Therefore, the "Test Unit Ready" command in a sense "samples" the reservation time period (Rvt) and the release time period (Rlt) in order to ascertain the shape and frequency of the software pulse waveform.

Figure 4:
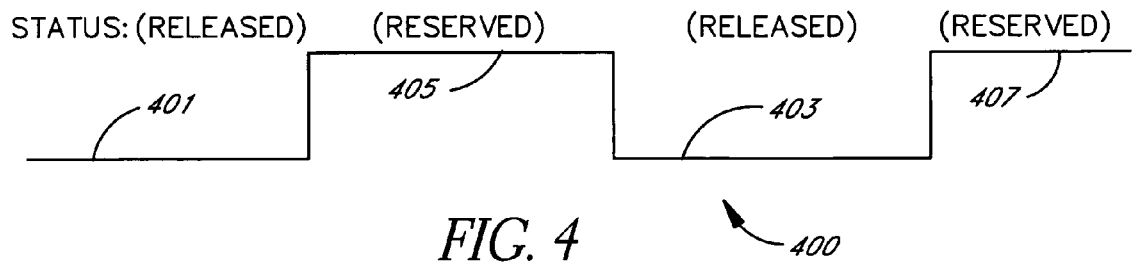
FIG. 4 illustrates one method of sampling the software-generated pulse waveform by determining if the SCSI device is reserved or released at a predetermined sampling frequency.

Referring to FIG. 4, a graphical representation of the Test Unit Ready command sampling protocol is illustrated. The results of the Test Unit Ready command are indicated by either an "S" or an "F", wherein S indicates a successful test when the device 105 is released by the host server 101 and F indicates a failed test when the device 105 is reserved by the host server 101. As shown in FIG. 4, the released status is represented as a logic level low at elements 401 and 403 of the software pulse waveform 400 and the reserved status is represented as logic level highs at elements 405 and 407 of the software pulse waveform 400. Above the pulse waveform 400, the results of the "Test Unit Ready" command are indicated by S and F, wherein S (successful test) corresponds to the released status and F (failed test) corresponds to the reserved status. It should be noted that since a logic level high was arbitrarily selected as representing the reserved status and the logic level low was arbitrarily selected as representing the released status, these representations can be switched and still provide the signaling functionality as described above in accordance with the invention.

Figure 5:
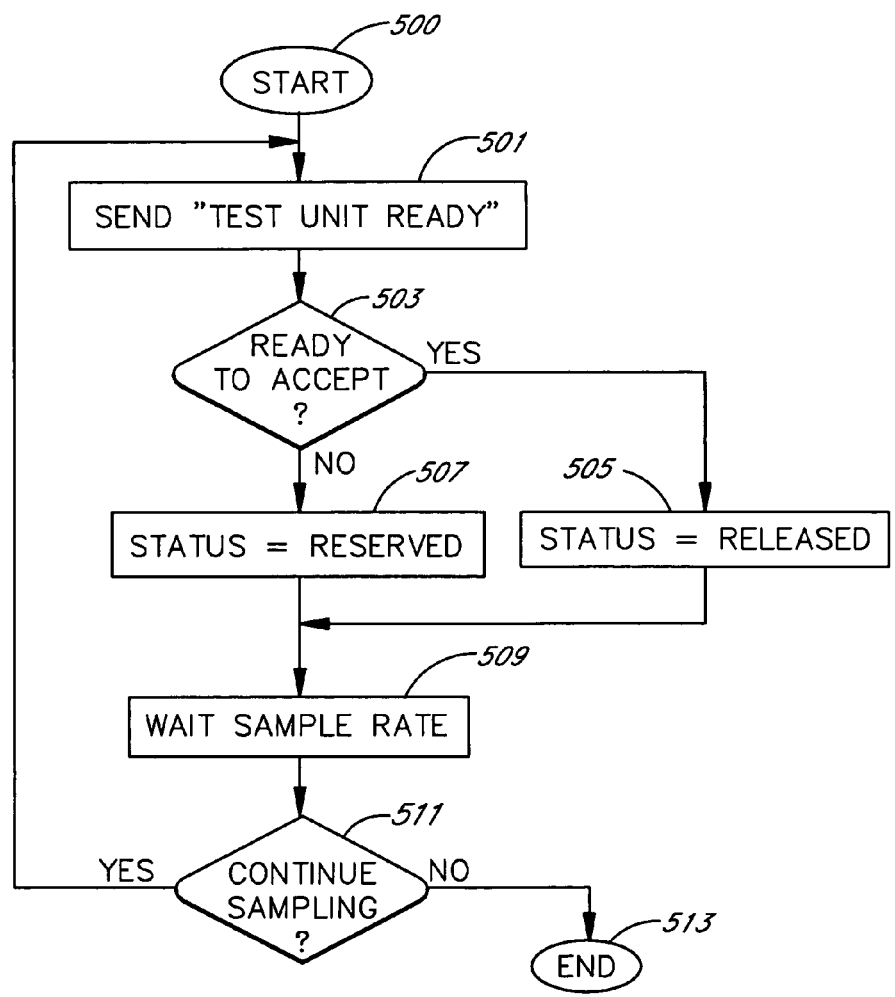
FIG. 5 is a flowchart diagram illustrating the steps of one embodiment of a pulse receiver software program for receiving the software-generated pulse waveform in accordance with the invention.

FIG. 5 illustrates a flowchart diagram of one embodiment of a pulse receiving process in accordance with the invention. The process starts at 500 and proceeds to step 501 wherein the secondary server 109 (FIG. 1) sends a Test Unit Ready command to the SCSI device 105 (FIG. 1) in response to which the device 105 will transmit data back to the secondary server 109. In step 503, the secondary server 109 determines whether the device 105 is ready to accept a SCSI command by processing the response data received by the device 105. If the result of the Test Unit Ready command is a success, the process moves to step 505 where the secondary server 109 records that the status of the device 105 is released, reflecting a "S" in the software generated pulse waveform as shown in FIG. 4. If the result of the Test Unit Ready command is a failure, the process moves to step 507 where the secondary server 109 records that the status of the device 105 is reserved, reflecting a "F" in the software generated pulse waveform as shown in FIG. 4. In step 509, the secondary server 109 waits until the next sample of the pulse waveform is to be taken. In step 511, a determination is made as to whether to continue taking samples. If the answer is Yes, the process goes back to step 501 and the above process steps are repeated. If the answer is No, the process ends at step 513.

The foregoing describes one embodiment of a process for transmitting a software-generated pulse waveform by a first server 101 and receiving the software-generated pulse waveform by a second server 109, in accordance with the invention. Some useful applications of the software-generated pulse waveform are described below.

Pulse Waveform as "Heartbeat" of Primary Server

The pulse waveform can be monitored by a secondary server to determine if a primary server is present and operational. The primary server can send a pulse waveform to the secondary server as described above in order to tell the secondary server that it is "alive and well". In this way, the pulse waveform serves as a kind of "heartbeat" of the first server which the second server listens for. If the pulse transmitter sends a constant pulse, the waveform can be determined and predicted. This does not mean that the reservation time Rvt must be equal to the release time Rlt, but rather all Rvt's are predictable and all Rlt's are predictable. A pulse with a smaller Rvt minimizes the amount of time a device is reserved, while still creating a heartbeat.

In order to determine the shape, or period, of the pulse waveform, the second server sends a Test Unit Ready command to a SCSI device in order to sample the waveform as described above. The second server can ascertain the cyclic period of the pulse waveform by noting the transition points (from S to F or F to S) of the waveform and recording the number of samples taken between the transition points after several successive cycles of the waveform. Once the waveform is known, there is no need to keep sampling the waveform at the previous sampling rate in order to monitor the presence of the waveform. Instead, samples can be taken out of phase from the transition points and less frequently based on the known period of the waveform in order to ascertain its presence. By taking samples less frequently, the processing time and circuitry overhead of this communication and monitoring method is significantly reduced. This concept is described in greater detail below with reference to FIGS. 6 and 7.

Referring to FIG. 6, a software-generated pulse waveform is shown. After the second server has determined the period of the waveform 600, it does not need to sample the waveform at the sampling rate. Instead the second server samples the waveform at a first reference point 601 and at a second reference point 603 approximately 180° out of phase from the first reference point 601. Because the second server has previously recorded the shape and period of the waveform, it sends a Test Unit Ready command to the SCSI device at a time corresponding to the reference point 601 and expects to see an "S" (a successful test result indicating a Released status). Similarly, at reference point 603, it expects to see an "F" (a failed test result indicating a Reserved status). It is appreciated that the reduced number of Test Unit Ready commands that must be transmitted to the SCSI device and the reduced number of results that must be subsequently processed significantly reduces processing time and other system resources that must be allocated to perform this function.

To further decrease the overhead of monitoring the pulse waveform, samples can be taken several cycles apart on the pulse waveform as shown in FIG. 7. FIG. 7 illustrates a pulse waveform 700, wherein the second server samples the waveform 700 at a first reference point 701 where it expects to see a release state. After several cycles of the waveform, the second server samples the waveform 700 at a second reference point 703 where it expects to see a reserve state.

By monitoring the pulse waveform as described above, the operational status of the first server can be determined by the second server. The first server is considered operational if the expected results of the monitoring process are obtained. However, if the results indicate a constant released state, either the monitoring mechanism (the reference points) are out of synchronization or the first server is dead and the heartbeat has flatlined. Going out of synchronization is possible, but not common. Therefore, in one embodiment, the monitoring process of the invention checks for this possibility by "recalibrating" the pulse receiving process. This is done by repeating the sampling process as described above with respect to FIGS. 4 and 5. In this way, the presence of the pulse can be reverified. Once the shape and cyclic period of the pulse waveform generated by the first server has been redetermined, the second server can once again begin monitoring the waveform at the recalibrated reference points. However, if the pulse waveform is no longer present, it is determined that the first server is dead. In a clustered system, the second server can send a command to the Network Directory Database (NDD) to inform the NDD that it is assuming control over the resources previously handled by the first server.

Figure 8:
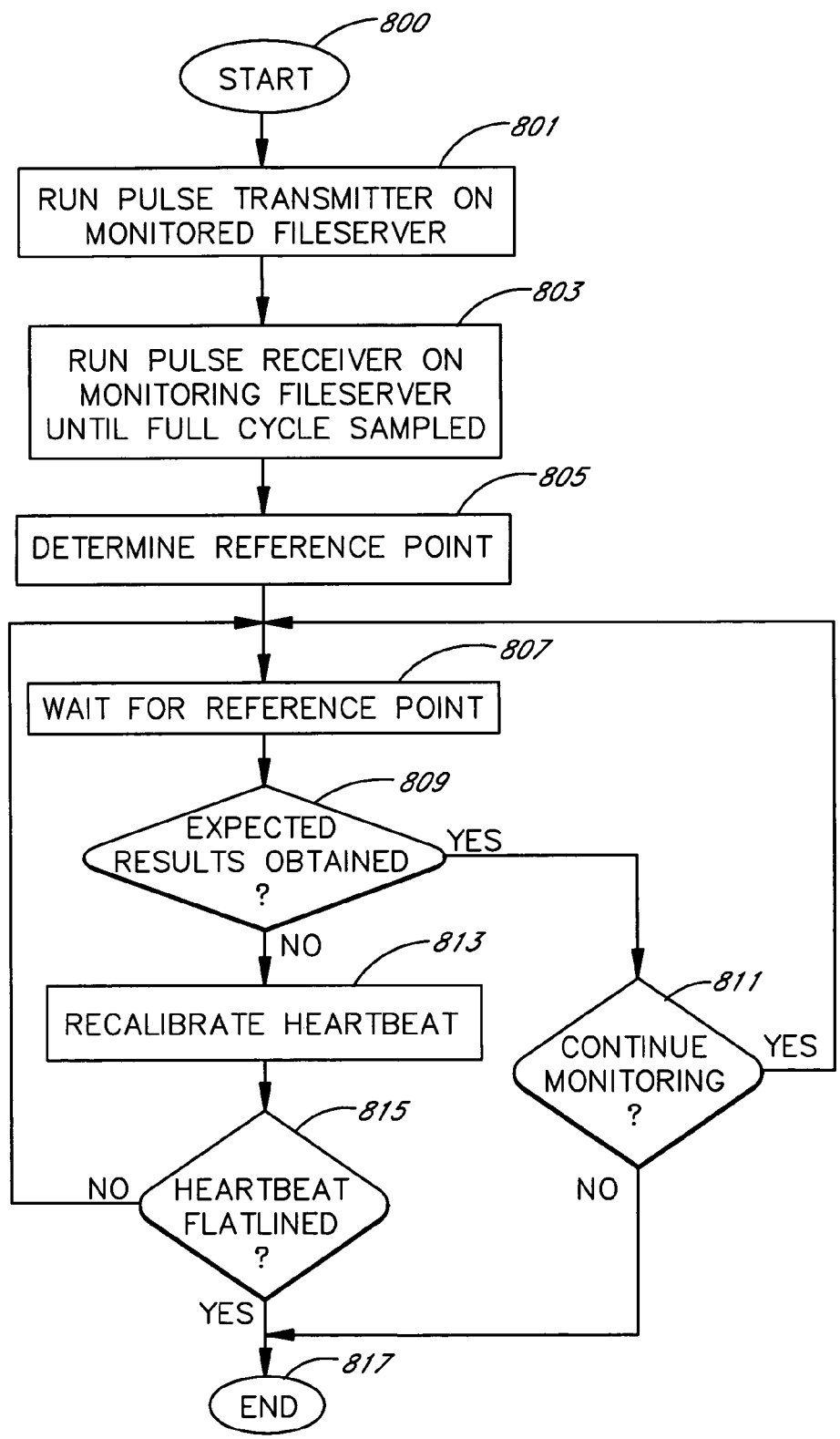
FIG. 8 is a flowchart diagram illustrating one method of monitoring the pulse waveform in accordance with one embodiment of the invention.

FIG. 8 illustrates a flowchart diagram of one embodiment of the process of monitoring the "heartbeat" of the first server. The process starts at 800 and proceeds to step 801, where the first server executes the pulse transmitter by sending Reserve and Release commands to the SCSI device. In step 803, the second server executes the pulse receiver by sending Test Unit Ready commands to the SCSI device, until at least one full cycle of the pulse waveform has been sampled. In step 805, the second server determines the reference points at which the pulse waveform is to be subsequently sampled in order to monitor its presence. In step 807, the second server waits until the next reference point of the waveform is to be sampled. In step 809, the second server samples the waveform at the reference point and determines whether the expect result was obtained. If the expected result is obtained, the process moves to step 811 wherein the second server determines whether to continue monitoring the first server. If the answer is Yes, the process moves back to step 807 and proceeds once again from this step. If the answer is No, the process ends at step 817.

If in step 809, the expected results are not obtained, the process moves to step 813 in which the pulse waveform, or "heartbeat" is recalibrated as described above. In step 815, the second server determines whether the heartbeat has flatlined, i.e., whether the pulse waveform is still present. If it is determined that the heartbeat is still there, the process moves back to step 807 and once again proceeds from there. However, if in step 815 it is determined that the heartbeat has flatlined, the first server is deemed dead, and the process ends at step 817.

Pulse Waveform as Clock

Figure 9:
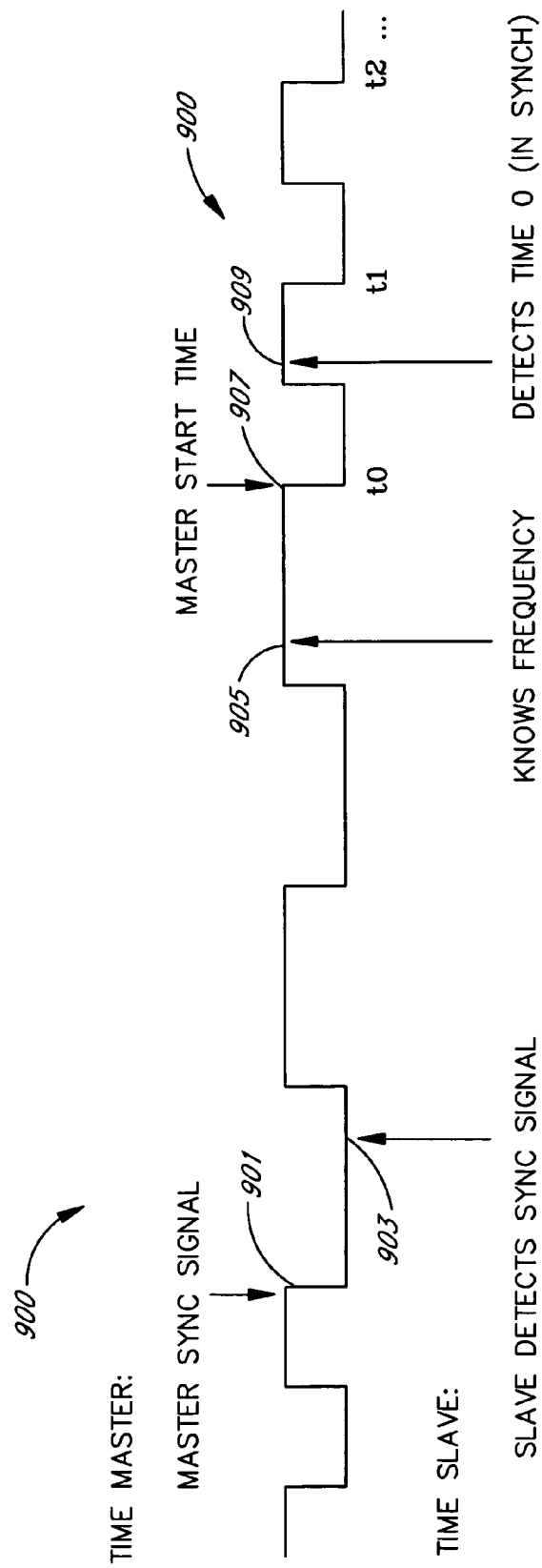
FIG. 9 illustrates a modulated pulse waveform which may be utilized for the purpose of timing and/or synchronizing two servers with respect to one another in accordance with one embodiment of the invention.

Another use of the pulse generator is to provide a clock which may be used to synchronize time and events carried out by two or more servers. FIG. 9 illustrates one method of using the pulse waveform as a synchronizing mechanism. Based on the heartbeat design, a pulse waveform 900 is generated by a first server which acts as a time master. A second server acts as a time slave and runs the pulse receiver program as described above with respect to FIG. 5 to sample the pulse waveform. Similar in concept to a radio station sounding a bell to synchronize time, the time master will disrupt its usual pulse waveform and send a synchronization signal. In FIG. 9, this synchronization signal is indicated by a change in frequency starting at element 901 of the pulse waveform 900. The change in frequency may generate a pulse waveform at half the original frequency, for example. At element 903, the slave server, expecting to see a logic level high but seeing a logic level low instead, recognizes the change in frequency and restarts sampling of the pulse waveform. At element 905 of the waveform 900, the slave server knows the frequency of the synchronization signal. At element 907, the master server returns to normal frequency. The slave recognizes the change in frequency at element 909 when it expects to see a low level but instead sees a high level. The slave then marks the beginning of that cycle as "Time 0". The beginning of each cycle thereafter is successively numbered as T1, T2, etc. Therefore, both the master and slave servers now have a common reference point in time, T0, which can be used to synchronize processes and events occurring in the two servers.

Figure 10:
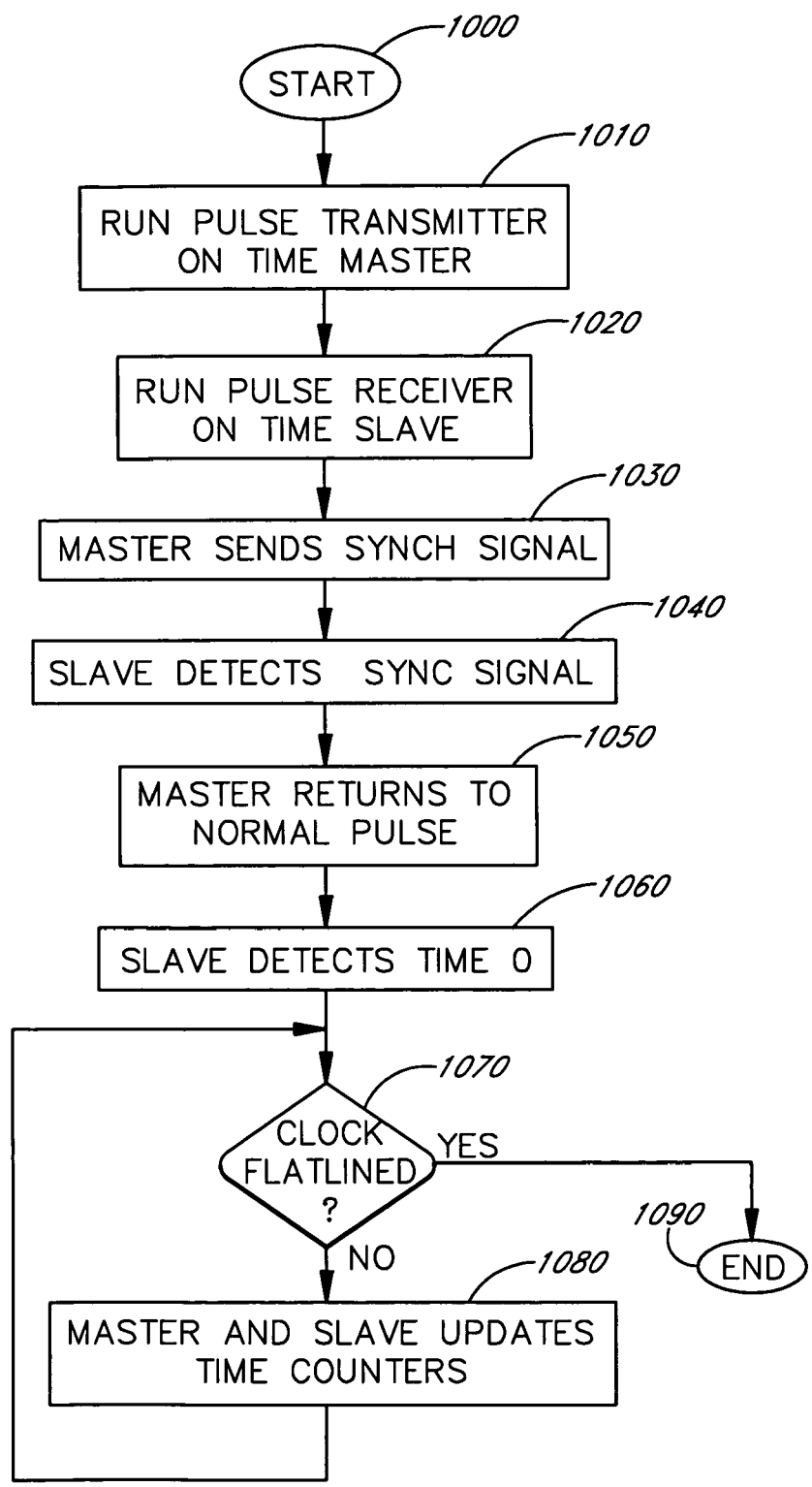
FIG. 10 is a flowchart diagram illustrating one method of modulating the pulse waveform in order to provide a timing and synchronization signal for two servers in accordance with one embodiment of the invention.

FIG. 10 shows a flowchart of one embodiment of the process of synchronizing two servers in accordance with the invention. The process starts at step 1000 and proceeds to step 1010 where the first server (the time master) runs the pulse transmitter program. In step 1020, the second server (the time slave) runs the pulse receiver program in order to sample and record the pulse waveform generated and transmitted by the time master. This sampling is performed at a sampling rate, which is much faster than the frequency of the pulse waveform. In step 1030, the master sends a synchronization signal by changing the frequency of the pulse waveform to one half its original frequency, for example. In step 1040, the slave detects the synchronization signal. In step 1050, the master returns to the normal frequency of the original pulse waveform. In step 1060, the slave detects the change back to the original frequency and marks the beginning of the first cycle of the reinstated original frequency as "Time 0". In step 1070, the second server determines if the perceived change in frequency of the pulse waveform is due to a flatline condition of the pulse waveform. If in step 1070, it is determined that the pulse waveform has not flatlined, the process moves to step 1080 and the master and slave servers update their time counters and set time T0 as a common reference point in time for synchronization purposes. The process then moves back to step 1070 and checks whether the pulse waveform has flatlined. Each time it is determined that the pulse waveform is still present, the master and slave servers increment, i.e., update, their timers by one. However, if in step 1070, it is determined that the pulse waveform has flatlined, the process ends as step 1090 and synchronization has failed.

Pulse Waveform as Messaging Device

In the embodiment described above, the communication between the two servers is unidirectional (from master to slave) and the slave does not acknowledge synchronization with the master. A bidirectional clock can be implemented as an enhancement to the above timing mechanism in which the slave can acknowledge the detection of Time 0 so that the master receives validation of synchronization. In a bidirectional clock system, both servers run both the pulse transmitter and the pulse receiver programs. Also, a second SCSI device to which the second server is the host server must be provided in order to implement bidirectional communications between the first and second servers. With this arrangement, the second server "owns" the second SCSI device and transmits Reserve and Release commands to the second SCSI device and the first server samples and monitors the status of the second SCSI device as described above.

With a bidirectional communication protocol as described above, the invention may also be utilized to provide not only timing and synchronization between two servers but also messaging between the two servers. Since the pulse waveform can be bi-directional and there are no restrictions on the waveform, a messaging protocol can be established between the two servers via the SCSI bus using frequency modulation. A simple Request/Acknowledge protocol, with session control (the ability for both sides to initiate communication) may be used.

Referring to FIG. 11, one embodiment of a bi-directional pulse waveform message signal is illustrated. A message is incorporated into the pulse waveform by modulating the duration or pulse width of the Reserved state (indicated by a logic level high) of the waveform. As shown in FIG. 11, a "R" is indicated at element 1101, a "T" is indicated at element 1103 and a "S" is indicated at element 1105. A group of Rvt values, each separated by a constant Rlt make up a command or message. The message shown in FIG. 11 is the "RTS" signal which is a request to send a command to the other server (begin communication session). This command signal as well as others is described in further detail below with respect to FIG. 12. When no communication is occurring, a uniform Rvt=Rlt pulse is sent.

As mentioned above, to accommodate a bi-directional communication mechanism, both file servers must run the pulse transmitter and pulse receiver programs, and both servers must each "own" one device to which it can transmit Release and Reserve commands while the other server samples the status of that device at the sample rate. FIG. 12 illustrates one example of a possible communication protocol between two file servers. A second server 109 first sends a Request to Send (RTS) command to the first server 101. The first server 101 then responds with a Ready to Receive (RTR) signal which establishes communications between the two servers. Next, the second server 109 sends a Request (REQ) signal to the first server 101. The first server 101 then sends back either an Acknowledge (ACK) signal or Not Acknowledge (NAK) signal which indicates that the first server 101 can or cannot process the second server's request. After receiving a NAK signal, the second server 109 will terminate communications by sending a Relinquish (REL) to the first server 101. If an acknowledge (ACK) signal is sent back, the first server 101 will process the request signal from the second server 109 and send a Result (RES) signal to the second server 109 after which the second server terminates communications by sending a Relinquish (REL) signal to the first server 101.

The following is a summary of the messages/commands discussed above:

RTS: Request to send a command to the other file server (begin communication session).

RTR: Ready to receive—other server agrees to accept a command.

REQ: The command requesting certain actions/data on the part of the receiving server (defined by application).

ACK: The other server acknowledges the arrival and ability to service the command.

NAK: The other server does not support that command.

RES: The results of the command.

REL: The initiating server relinquishes control (end of session).

Figure 13A:
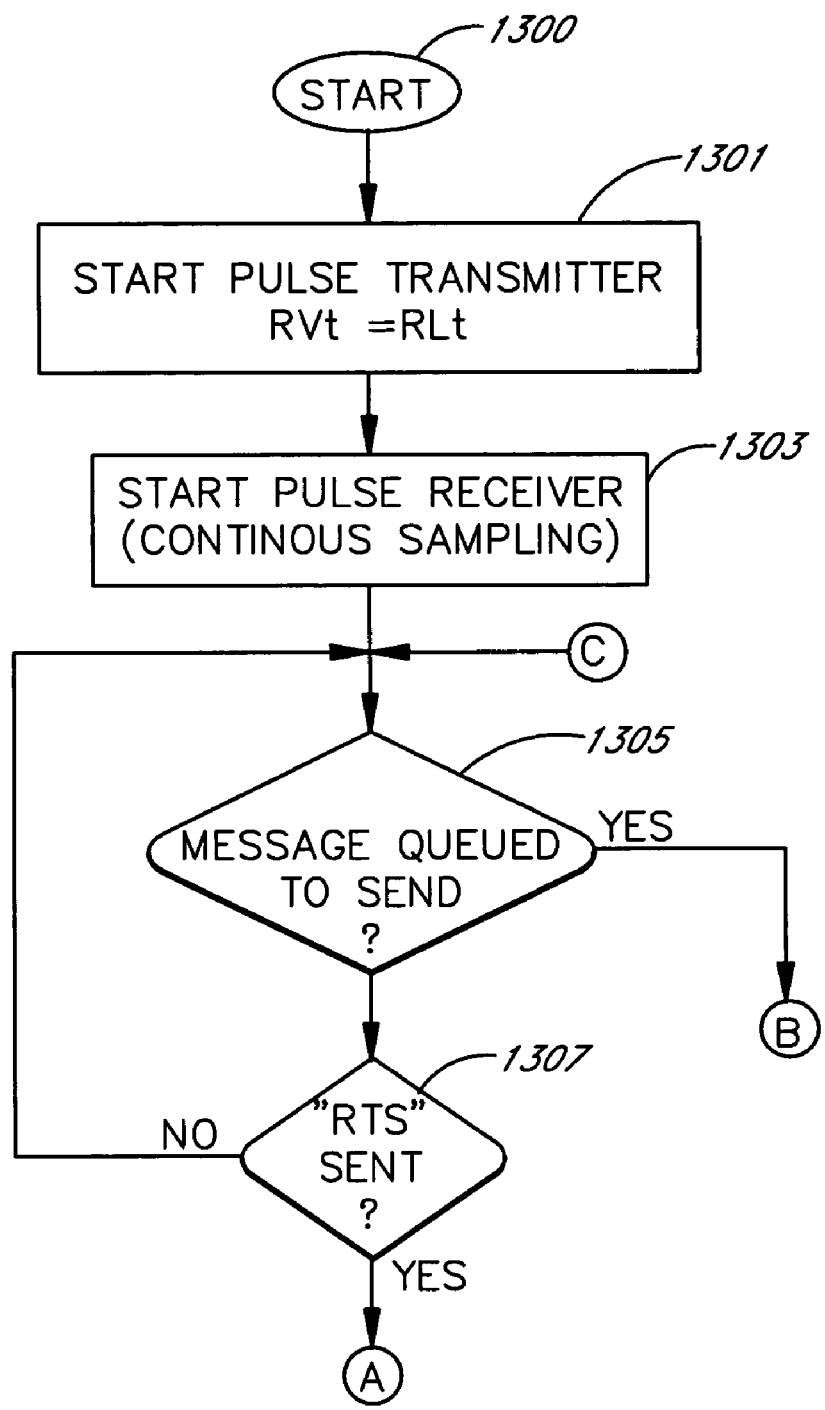
FIGS. 13A-13C together form a flowchart diagram illustrating a messaging protocol between two servers in accordance with one embodiment of the invention.
Figure 13B:
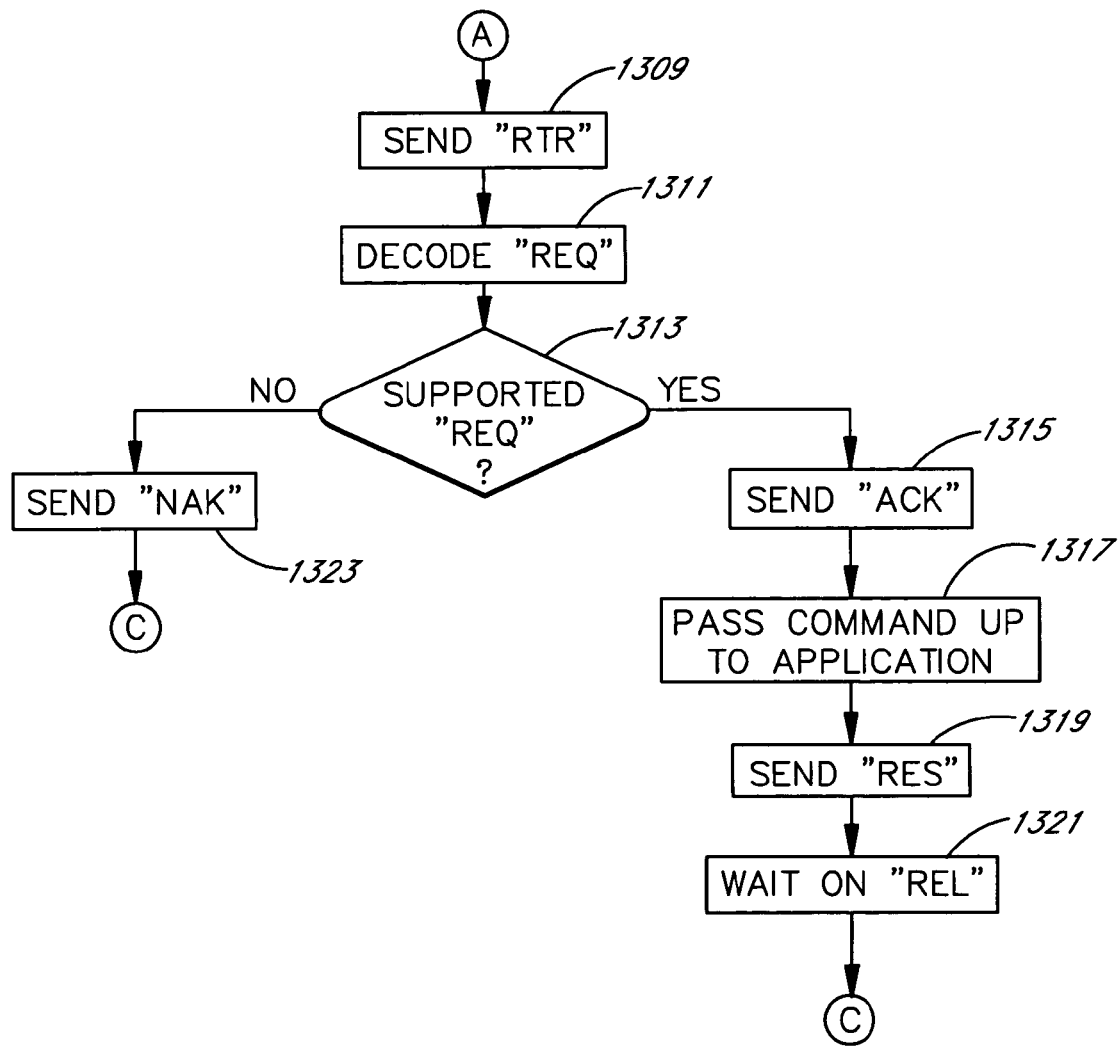
Figure 13C:
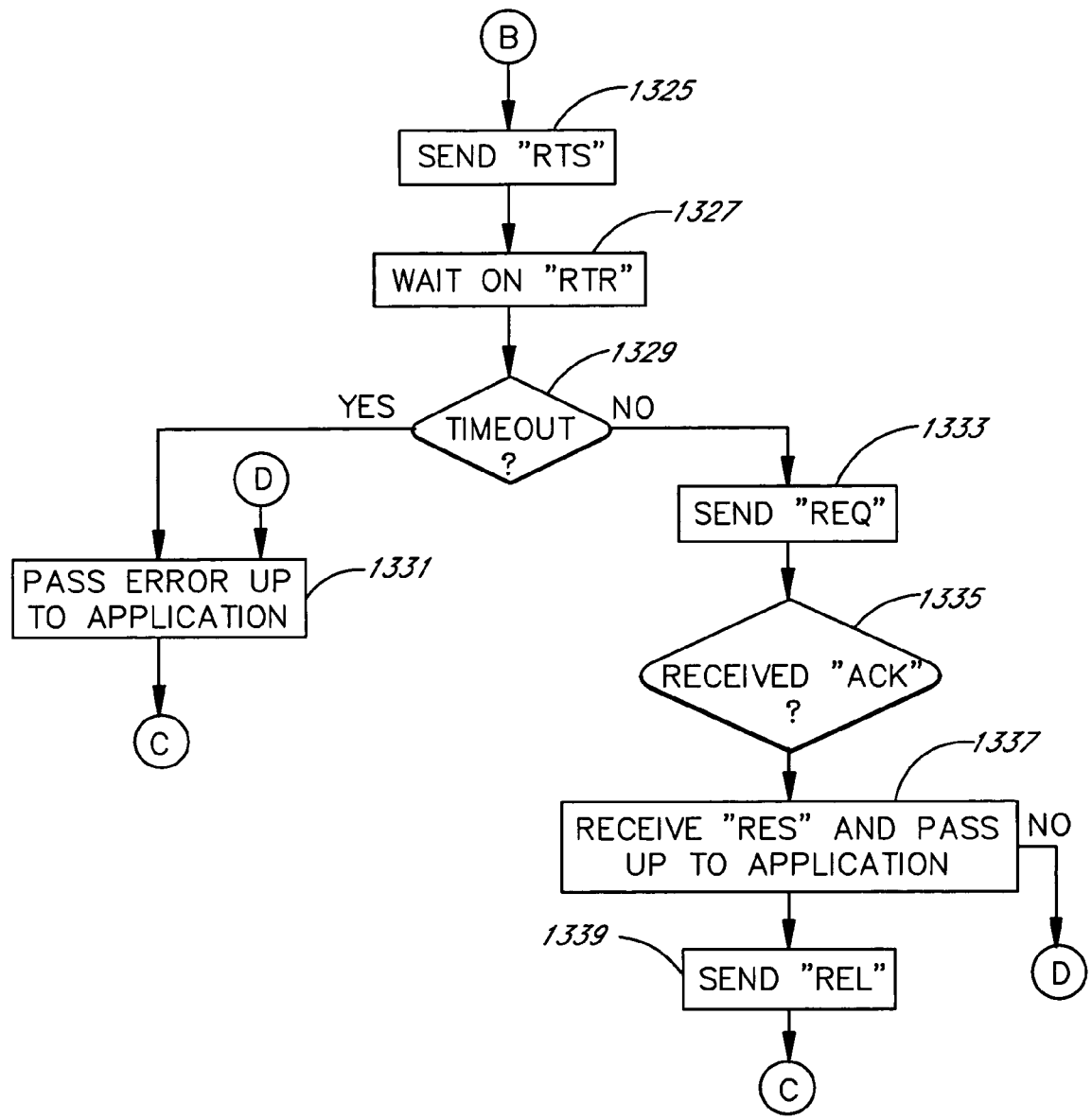

Referring to FIGS. 13A-13C a flowchart diagram of one embodiment of a bi-directional communication protocol in accordance with the invention is illustrated. The process starts at 1300 and proceeds to step 1301 wherein both servers start running the pulse transmitter program to generate a uniform pulse waveform wherein Rvt=Rlt. In step 1303, both servers initiate the pulse receiver program to continuously sample the pulse waveform generated by the other server. As used herein the term "continuous sampling" means that the pulse receiver is sampling the pulse waveform at every "tick" or cycle of the sampling frequency, which is greater than the frequency of the pulse waveform, in order to determine the shape and frequency of the waveform, rather than sampling at only select reference points of the waveform for monitoring purposes.

In order to simplify the discussion, the following description of the remaining portions of the flowchart is provided from the perspective of only one of the two servers, the first server. However, it is understood that the roles of the first and second servers are interchangeable in the following discussion. In step 1305, the first server determines whether it has a message to send to the second server. If the first server does not have a message queued to send to the second server, the process moves to step 1307 wherein the first server determines whether a Request to Send (RTS) command has been sent by the second server. If the first server has not received a RTS signal from the second server, the process returns to step 1305, wherein the first server continues to poll itself as to whether it has a message to send to the second server. If in step 1307, it is determined that the second server has sent a RTS signal to the first server, the process moves to step 1309 as shown in FIG. 13B. In step 1309, the first server sends back a Ready to Receive (RTR) signal to the second server, agreeing to accept a command from the second server. Thereafter, in step 1311, the first server receives the request (command) from the second server and decodes the request. In step 1313, the first server determines whether it can support or accommodate the request from the second server. If it is determined that the first server can support the request, in step 1315, the first server sends an acknowledgement (ACK) signal to the second server. In step 1317, the first server passes the request up to an application software program running on the first server to process the request. In step 1319, the first server sends the results of the application program to the second server. In step 1321, the first server waits for a relinquish (REL) signal from the second server which terminates communications between the two servers and sends the process back to step 1305 of FIG. 13A at which point the first server once again resumes polling whether it has a message to send to the second server.

If in step 1313, the first server determines that it does not support the request sent by the second server, in step 1323, the first server sends a Not Acknowledge (NAK) signal to the second server which informs the second server that the first server does not support that command. The process then moves back to step 1305 wherein the first server continues to poll itself as to whether it has a message to send to the second server.

If in step 1305, the first server determines that it has a message queued to be sent to the second server, the process moves to step 1325 of FIG. 13C. In step 1325, the first server sends a Request to Send (RTS) signal to the second server which requests the second server to accept a command from the first server. In step 1327, the first server will wait for a Ready to Receive (RTR) from the second server. In step 1329, the first server determines if a timeout period has expired. If the timeout period has expired before a RTR signal is received from the second server, the process moves to step 1331 in which the first server passes an error message to application software indicating that the second server is not responding. The process then moves back to step 1305 of FIG. 13A.

If in step 1329, the first server receives a RTR signal from the second server before the timeout period expires, the process moves to step 1333 in which the first server will send a request, or command, to the second server. In step 1335, the first server determines whether an acknowledge (ACK) signal has been returned by the second server. If the second server does not send an ACK signal or, instead, sends back a Not Acknowledge (NAK) signal, the process moves back to step 1331 in which the first server sends an error signal to the application software indicating that the second server does not support the request. However, if in step 1335, the first server receives the ACK signal from the second server, the process moves to step 1337 in which the first server receives the response (RES) signal(s) from the second server and passes the response to application software for processing. Thereafter, in step 1339, the first server sends a relinquish (REL) signal to the second server thereby terminating communications with the second server. The process then moves back to step 1305 wherein the first server determines whether it has a message to send. If not, in step 1307, the first server determines if the second server wants to send it a message. This process may be recursive and continue to execute until it is terminated by each of the servers.

As described above, the invention provides an efficient and reliable method and system for communicating between two servers in a server network. Because the communication method and system does not transmit data to be stored in an intermediate device, such as a hard disk drive, it does not depend on the presence or operational status of such a device. Rather, some embodiments of the invention take advantage of an existing protocol for establishing control of a SCSI device, namely, the Reserve and Release commands sent by a host server to a SCSI device. By sampling and monitoring the Reserve and Release status of the SCSI device by a second server which is also coupled to the device, the second device can monitor the presence and operational status of the host server, without directly communicating to the host server via an intermediate disk drive as is done in prior art systems. The Reserve and Release status of the SCSI device is used to generate a software-generated pulse waveform which serves as a sort of "heartbeat" of the host server and which can be monitored by the second server. Because the Reserve and Release commands are already implemented in existing SCSI device protocols, the method and system of the invention, once established, requires very little overhead, in terms of processing time and system resources, and is inexpensive to implement.

Because there are no limitations as to the shape and frequency of the software generated pulse waveform, the waveform may be frequency modulated in order to provide timing and synchronization signals to two servers. Additionally, by implementing each server as both a sender of Reserve and Release commands to a respective SCSI device, and a monitor of a the respective SCSI device, bi-directional communications can be established between the two servers. This method and system of communication between two servers is further advantageous in that it may be implemented with existing resources and command protocols between a server and a SCSI device and, additionally, it can be turned on and off as desired.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A method of determining the status of a server comprising:
    transmitting status commands from a first server to a device which is coupled to the first server;
    monitoring with a second server the status of the device; and
    determining with the second server the status of the first server based on the status of the device.

2. The method of claim 1 wherein a changing device status indicates that the first server remains operational.

3. The method of claim 1 wherein a constant device status indicates that the first server has failed.

4. The method of claim 1 wherein the first server controls at least one network resource.

5. The method of claim 4 further comprising assigning control of the network resource to the second server based on the status of the device.

6. The method of claim 1 wherein the status commands comprise a pulse waveform.

7. The method of claim 1 wherein the status commands comprise reserve and release commands.

8. The method of claim 1 wherein the device is a SCSI device.

9. An apparatus for determining the status of a server comprising:
    a first server that is configured to transmit status commands to a device which is coupled to the first server; and
    a second server that is configured to monitor the status of the device and wherein the second server is further configured to determine the status of the first server based on the status of the device.

10. The apparatus of claim 9 wherein a changing device status indicates that the first server remains operational.

11. The apparatus of claim 9 wherein a constant device status indicates that the first server has failed.

12. The apparatus of claim 9 wherein the first server controls at least one network resource.

13. The apparatus of claim 12 wherein control of the network resource is assigned to the second server based on the status of the device.

14. The apparatus of claim 9 wherein the status commands comprise a pulse waveform.

15. The apparatus of claim 9 wherein the status commands comprise reserve and release commands.

16. The apparatus of claim 9 wherein the device is a SCSI device.

17. An apparatus for determining the status of a server comprising:
    means for transmitting status commands from a first server to a device which is coupled to the first server;
    means for monitoring the status of the device; and
    means for determining with a second server the status of the first server based on the status of the device.

18. The apparatus of claim 17 wherein a changing device status indicates that the first server remains operational.

19. The apparatus of claim 17 wherein a constant device status indicates that the first server has failed.

20. The apparatus of claim 17 wherein the first server controls of at least one network resource.

21. The apparatus of claim 17 further comprising assigning control of the network resource to the second server based on the status of the device.

22. The apparatus of claim 17 wherein the status commands comprise a pulse waveform.

23. The apparatus of claim 17 wherein the status commands comprise reserve and release commands.

24. The apparatus of claim 17 wherein the device is a SCSI device.

* * * * *